United States Patent
Klock et al.

(10) Patent No.: US 7,945,240 B1
(45) Date of Patent: *May 17, 2011

(54) MOBILE COMMUNICATIONS BILLING ARCHITECTURE

(75) Inventors: Jacqueline Klock, Cumming, GA (US); Beverly Ann Bowman, Kennesaw, GA (US); Deborah L. Ballot, St. Charles, IL (US); Selena G. Womac, Alpharetta, GA (US); Rebecca Winter, Marietta, GA (US); Kenneth Dale Heil, Marietta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 1197 days.

This patent is subject to a terminal disclaimer.

(21) Appl. No.: 11/383,187

(22) Filed: May 12, 2006

Related U.S. Application Data

(60) Provisional application No. 60/680,928, filed on May 13, 2005.

(51) Int. Cl.
*H04M 11/00* (2006.01)
(52) U.S. Cl. ......... 455/406; 455/407; 455/466; 455/566
(58) Field of Classification Search .......... 455/406–408, 455/466
See application file for complete search history.

(56) References Cited

U.S. PATENT DOCUMENTS

| | | | |
|---|---|---|---|
| 5,631,947 A | 5/1997 | Wittstein et al. | |
| 6,198,915 B1 | 3/2001 | McGregor et al. | |
| 6,847,816 B1 * | 1/2005 | Sarradin | 455/407 |
| 6,941,272 B2 | 9/2005 | Dutta | |
| 6,947,723 B1 * | 9/2005 | Gurnani et al. | 455/406 |
| 7,024,174 B2 * | 4/2006 | Nagy et al. | 455/408 |
| 7,239,862 B1 * | 7/2007 | Clare et al. | 455/406 |
| 2002/0115424 A1 * | 8/2002 | Bagoren et al. | 455/408 |
| 2003/0060186 A1 * | 3/2003 | Lehto | 455/406 |
| 2004/0242208 A1 | 12/2004 | Teicher | |
| 2005/0009499 A1 | 1/2005 | Koster | |
| 2005/0071179 A1 | 3/2005 | Peters et al. | |
| 2005/0076100 A1 * | 4/2005 | Armstrong | 709/219 |
| 2005/0086164 A1 | 4/2005 | Kim et al. | |
| 2005/0250538 A1 | 11/2005 | Narasimhan et al. | |
| 2006/0116892 A1 | 6/2006 | Grimes et al. | |
| 2006/0143098 A1 | 6/2006 | Lazaridis | |
| 2008/0195536 A1 * | 8/2008 | Karns et al. | 705/39 |
| 2008/0288351 A1 * | 11/2008 | Leung et al. | 705/14 |
| 2009/0164357 A1 * | 6/2009 | Frazier et al. | 705/34 |
| 2009/0204546 A1 * | 8/2009 | Haidar | 705/75 |
| 2009/0233576 A1 * | 9/2009 | Fieldhouse et al. | 455/406 |

* cited by examiner

*Primary Examiner* — Temica M Beamer

(57) ABSTRACT

A telecommunications payment system which includes a transaction component that facilitates the communication of at least billing and payment information to at least one of a plurality of mobile terminals. In operation the carrier will cause the transaction component to communicate an SMS message to the mobile terminal that includes a billing notification message. The notification message can include a current account balance, including total and past due, if applicable, the user's last payment method, and personal financial account data such as the last four digits of a credit card and/or bank account file. When providing the proper reply, payment processing is initiated such that an amount of funds will be transferred from the user's financial institution to the carrier back-office systems or its financial institution.

18 Claims, 19 Drawing Sheets

MOBILE COMMUNICATIONS BILLING ARCHITECTURE

CROSS-REFERENCE TO RELATED APPLICATIONS

This is an application claiming the benefit under 35 U.S.C. §119(e) of U.S. Provisional Patent Application Ser. No. 60/680,928, entitled "MOBILE COMMUNICATIONS BILLING ARCHITECTURE", which was filed May 13, 2005. The entirety of which is incorporated by reference herein.

TECHNICAL FIELD

This invention is related to billing and payment systems for wireless devices.

BACKGROUND OF THE INVENTION

Mobile communications technology is rapidly advancing the exchange of information between users and systems. The user is no longer tied to a stationary device such as a personal computer in order to quickly message another user. Portable wireless devices such as cell phones and PDAs (personal digital assistants), for example, are becoming more robust with respect to messaging capabilities.

Along with these rapid advances is the need to provide billing and payment services. Mobile carriers can employ a number of different methodologies in conventional use such as standard practices of paying by mail, web-based electronic payment schemes that require user interaction with a web page and by interactive voice response (IVR) systems that provide user selections to retrieve subscriber data and initiate payment, for example. With the advent of the Internet, and convergence of mobile networks with access to IP services of the Internet, greater opportunities now exist for providing more efficient and less costly means for account access and payment. Customers can view account balance information and minute balance information via the Internet, and WAP (wireless access protocol), which is a carrier-independent, transaction-oriented protocol for wireless data networks. However, such systems can require that the subscriber be online, and the navigation to the minute and balance information is cumbersome with these systems.

In one survey, the top three reasons customers contact a customer care representative and/or the customer care IVR system are to find out an outstanding balance, the remaining minutes on the mobile plan, and/or to pay the bill. Given the enormous number of mobile users today, call center representatives today can easily handle thousands of requests for bill payment per hour and the IVR system can easily be tasked to handle an equal number per hour. This typically equates to millions of requests per month for the IVR system and hundreds of thousands of requests per month to be handled by call center representatives from customers wanting to check their minute balance. This places an enormous expense on the carrier which is then passed down, to some extent, in additional fees and charges to the subscriber base. This information alone shows that customers want to know how many minutes they have remaining, how much they owe, and also want a fast easy way to pay their bill.

Accordingly, there exists a demand for improved customer care capability in the mobile wireless regime that lowers the costs of the carrier for customer care and enhances the capability of the subscriber to interact with account information to review billing and make payments.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The disclosed invention solves a problem in the art by providing a mechanism whereby customers of mobile terminals can be notified about their wireless services bills via the mobile terminal, and then be allowed to review and pay the bill, all from the mobile terminal. In one implementation, the wireless customer can opt-in (or subscribe) to receive the service. In operation, the subscriber will receive an SMS (short message service) message on at the mobile terminal that provides notification that the subscriber's monthly bill from the carrier is ready for payment. The subscriber can then authorize payment via the keypad of the mobile terminal.

The notification message can include, for example, the following subscriber account information: current account balance (including total and past due, if applicable), the last payment method (LPM) on file (e.g., credit card/bank account), and the last four digits of the subscriber credit card/bank account on file. The subscriber can then be prompted to reply to the message with a predetermined response (e.g., "past" or "total") to initiate an automatic payment of the account balance using the payment information indicated. In another implementation, the customer can be allowed to make a partial payment on the total outstanding balance. Additional steps can be added according to the particular requirements. For example, a customer whose LPM is a bank account can be presented with an additional step of agreeing to terms and conditions regarding their payment. Once the transaction is complete, a payment confirmation message can be sent to the subscriber/customer after the payment method has been authorized.

In one aspect thereof, billing notification text messages can be sent at predetermined times, for example, six days before the customer bill is due.

Services that are additionally provided include the following. By pressing *BAL# and sending, the subscriber can retrieve account balances, due dates, and the date the last payment posted to the account. By pressing *MIN# and sending, the customer can retrieve the number of minutes that have been used so far in the current billing period. The requested information is delivered in a text message on the mobile terminal for presentation to the customer. By pressing *PAY (without pressing the "#" key), the subscriber is directed into an IVR (interactive voice response) system that allows bill payment via a form of electronic payment (e.g., credit card or bank account).

The subject invention provides Customer Care services that can be used by both TDMA subscribers and GSM subscribers, with both types of subscribers having the exact same customer experience. Additionally, this service is implemented with the best possible customer care experience, such that accessing the services is easy with as few button clicks or menu selections as possible. Further, the service is implemented with an easy-to-remember dialing code for the various services, and provides two methods for accessing the services: via an SMS menu or directly via a short code. To reduce the cost of using these Customer Care methods, Customer Care functionality is implemented via SMS/USSD.

The service enables subscribers to perform Customer Care functions via SMS on their handsets. This drives more menial Customer Care tasks, such as checking if payments have been received or checking minutes used, to SMS messaging rather than Customer Care centers or the IVR. Doing so results in a tremendous savings in Customer Service as SMS messaging has a lower overhead cost than the IVR and Customer Service. In one implementation, all postpaid customers can use this service, but not prepaid customers. In another implementation, both postpaid and prepaid customers can use this service.

Accordingly, the invention disclosed and claimed herein, in one aspect thereof, comprises a telecommunications payment system which includes a transaction component that facilitates the communication of at least billing and payment information to at least one of a plurality of mobile terminals. The mobile terminals can include any mobile devices that support at least SMS (short message service) capability, for example, a cell phone, a PDA (personal digital assistant), a portable computer, a messaging-centric portable device, etc. In operation the carrier will cause the transaction component to communicate an SMS message to the mobile terminal that includes a billing notification message. The notification message can include the account balance, including total and past due, if applicable, the user's last payment method, and personal financial account data such as the last four digits of a credit card and/or bank account file. When providing the proper reply, payment processing is initiated such that an amount of funds will be transferred from the user's financial institution to the carrier back-office systems or its financial institution.

In yet another aspect thereof, an artificial intelligence (AI) component is provided in communication with a billing and payment system, the AI component employing a probabilistic and/or statistical-based analysis to prognose or infer an action that a user desires to be automatically performed.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
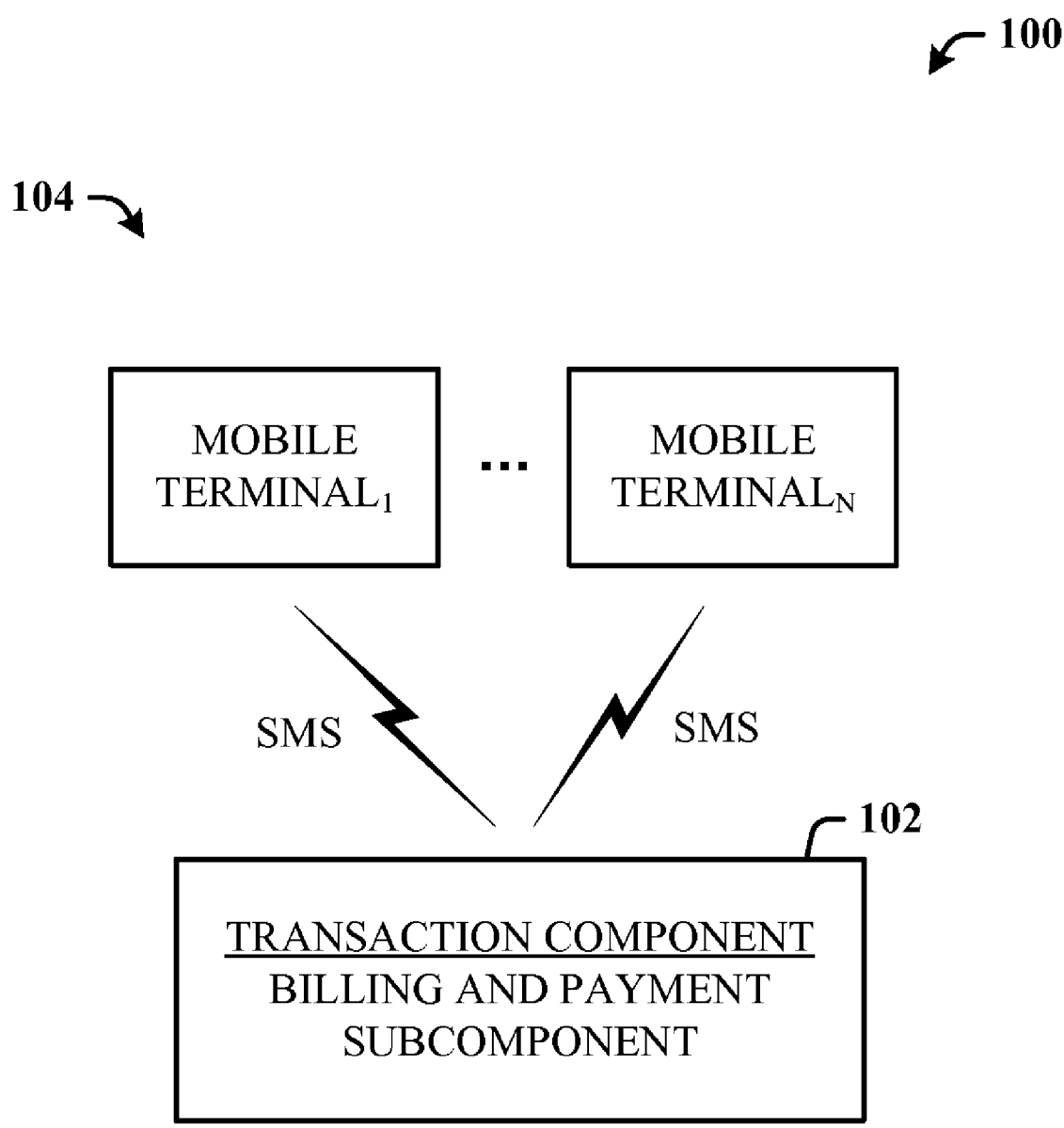
FIG. 1 illustrates a telecommunications payment system in accordance with the subject invention.

The invention is now described with reference to the drawings, wherein like reference numerals are used to refer to like elements throughout. In the following description, for purposes of explanation, numerous specific details are set forth in order to provide a thorough understanding of the subject invention. It may be evident, however, that the invention can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

While certain ways of displaying information to users are shown and described with respect to certain figures as screenshots, those skilled in the relevant art will recognize that various other alternatives can be employed. The terms "screen," "web page," and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

Referring initially to the drawings, FIG. 1 illustrates a telecommunications payment system 100 in accordance with the subject invention. The system 100 includes a transaction component 102 that includes a billing and payment subcomponent that facilitates the communication of at least billing and payment information to at least one of a plurality of mobile terminals 104 (denoted MOBILE TERMINAL$_1$, . . . , MOBILE TERMINAL$_N$, where N is an integer). The mobile terminals 104 can include any mobile devices that support at least SMS (short message service) capability, for example, a cell phone, a PDA (personal digital assistant), a portable computer, a messaging-centric portable device, etc.

In operation, the carrier will cause the transaction component 102 to communicate an SMS message to the mobile terminal that includes an account notification message. The notification message can include the account balance, including total and past due, if applicable, the user's last payment method, and personal financial account data such as the last four digits of a credit card and/or bank account file, for example. When providing the proper reply, payment processing is initiated such that an amount of funds will be transferred from the user's financial institution to the carrier back-office systems or its financial institution.

Figure 2:
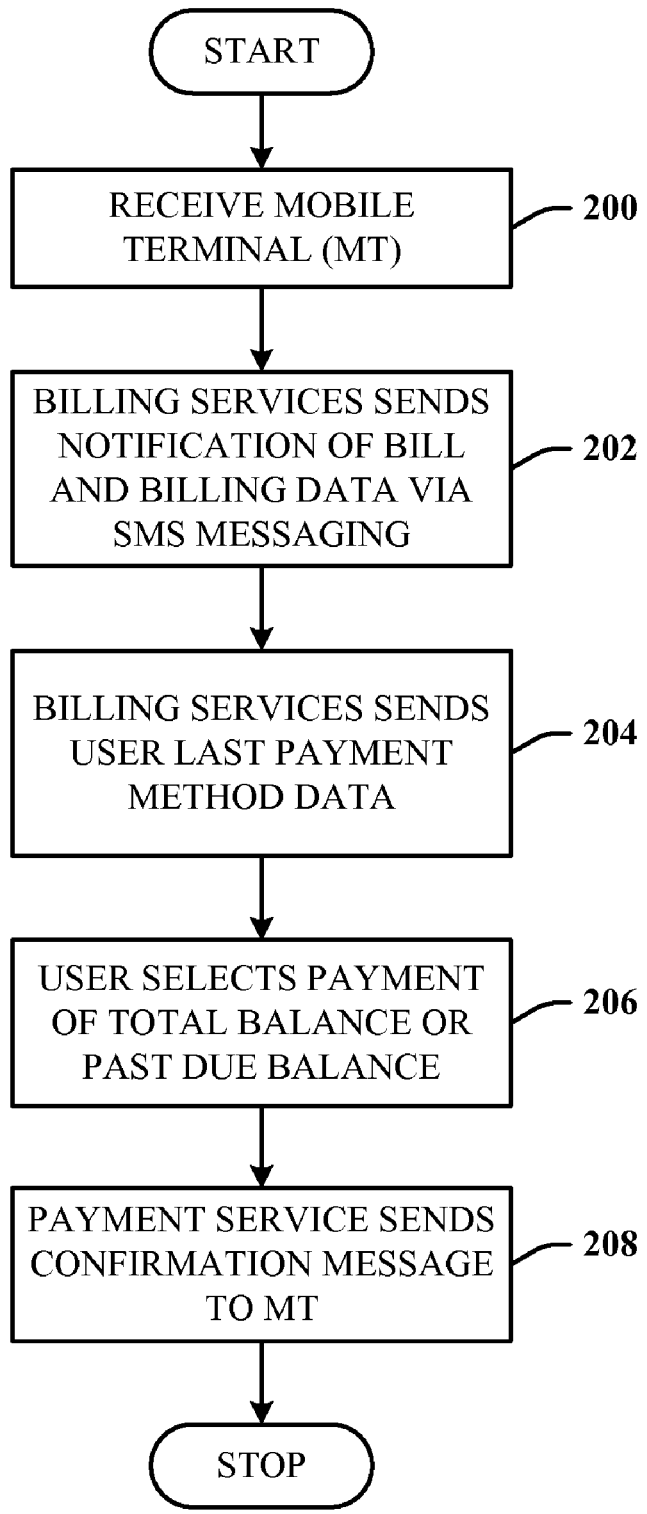
FIG. 2 illustrates a methodology of billing and payment processing in accordance with the invention.

FIG. 2 illustrates a methodology of billing and payment processing in accordance with the invention. While, for purposes of simplicity of explanation, the one or more methodologies shown herein, e.g., in the form of a flow chart, are shown and described as a series of acts, it is to be understood and appreciated that the subject invention is not limited by the order of acts, as some acts may, in accordance with the invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the invention.

At 200, a subscriber mobile terminal (MT) is provided in communication with a telecommunications carrier. At 202, the billing and payment component of the carrier sends notification to the MT of a bill and associated billing information via SMS messaging. The billing information can include the account balance, including total and past due, if applicable. At 204, the billing and payment component sends the user's last payment method via SMS messaging (e.g., credit card or bank account). The last payment method data can include the personal financial account data of the user, such as the last four digits of a credit card or bank account file. At 206, the user selects payment of the total balance due or the past due balance (if applicable) and initiates payment. At 208, the payment service sends a confirmation that the payment has been received. This can include actual notification from a financial institution of the subscriber (e.g., a bank, credit card company, etc.) to the carrier and then to the subscriber, that funds will be sent or have been sent to the carrier, or it can simply be a message that confirms authorization by the carrier to proceed with account processing against the subscriber financial institution(s).

Figure 3:
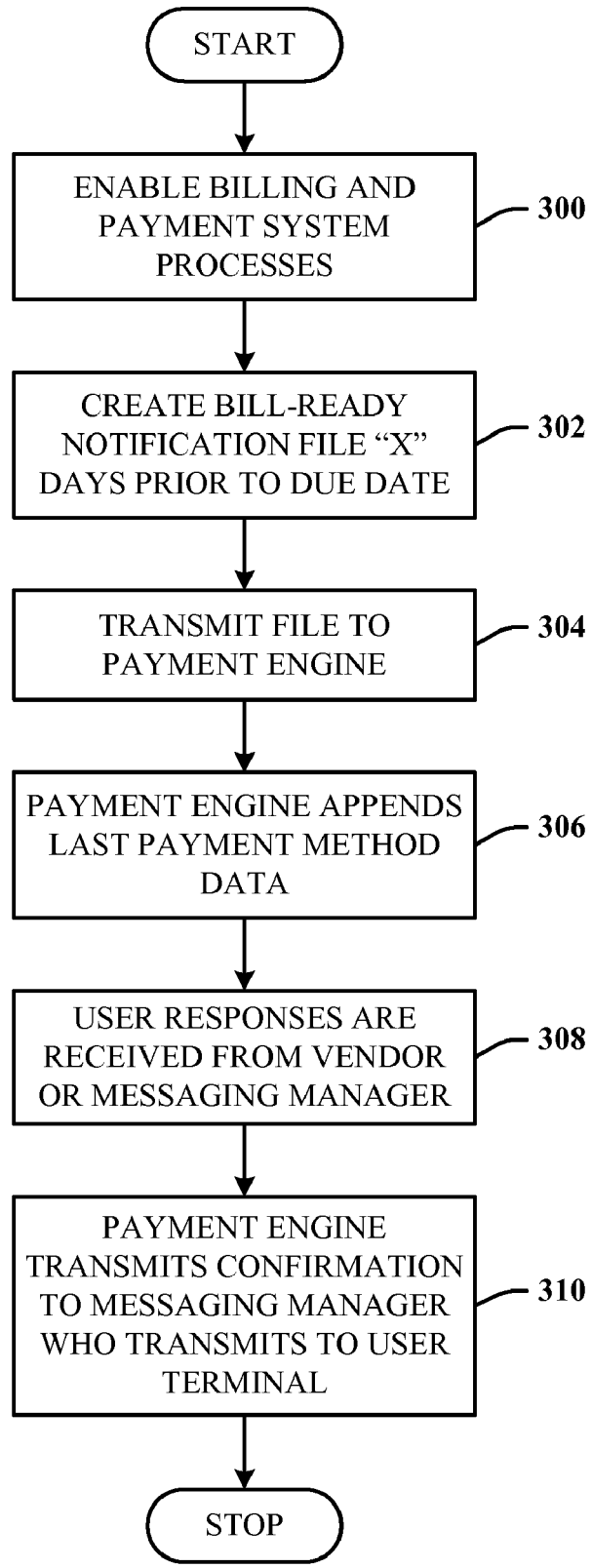
FIG. 3 illustrates another methodology of billing and payment processing in accordance with the invention.

Referring now to FIG. 3, there is illustrated another methodology of billing and payment processing in accordance with the invention. At 300, the billing and payments system processes are enabled. At 302, a bill-ready notification file is created a predetermined number of days (e.g., five or six days) prior to the due date of the payment. Specifically, the telecommunications carrier compiles a listing of subscribers whose bills are available for payment and who have opted-in (subscribed) to receive bill ready notifications. At 304, the file is transmitted to a payment engine. At 306, the payment engine appends last payment method (LPM) data thereto (e.g., credit card or bank account) and transmits the file of accounts to a vendor (e.g., QuickReach) where the transmission of the data to the user terminal occurs. At 308, user responses are then received from either the vendor, if the transaction is via a bank account (which requires additional messaging before payment transactions can be processed) or by the carrier's customer care messaging manager (e.g., ATLAS) system which will then interpret the message received (TOTAL or PAST) and transmit the appropriate transaction for payment via the payment engine (e.g., Quick-Pay). At 310, the payment engine will then send the confirmation message to the customer care messaging manager system and in turn, the customer care messaging manager system will transmit the confirmation via SMS to the user terminal.

Various details of the user interface and messaging system will now be described. Services and features (*Services) that are additionally provided include the following. Please be aware that the billing and payment system described above is one exemplary aspect of the *Services now described. By pressing *BAL# and sending, the subscriber can retrieve account balances, due dates, and the date the last payment posted to the account. By pressing *MIN# and sending, the customer can retrieve the number of minutes that have been used so far in the current billing period. By pressing *DATA# and sending, the customer can retrieve unbilled data information and various other data offerings associated with the customer's account. The requested information is delivered in a text message to the mobile terminal for presentation to the customer. Pressing *PAY# initiates payment of the selected amount via SMS messaging. By pressing *PAY (without pressing the "#" key), the subscriber can be directed into an IVR (interactive voice response) system that allows bill payment via a form of electronic payment (e.g., credit card or bank account).

While roaming, the payment (*PAY) functionality can function differently from the balance and minutes functionality. Customers who request information for these services should ensure they press the "#" key after the request (*BAL#, *MIN#, *DATA#). Once they have pressed these keys, no further action is necessary and within a predetermined time (e.g., ten seconds), an SMS message is delivered to the handset with the requested information. They will have the option of paying past due or total due via SMS using their LPM on file. Customers who wish to make a payment should press *PAY without pressing the "#" key. Once they have pressed *PAY, they will be directed into an IVR that will quickly process the information.

The subject invention facilitates user interaction with no special tools required, only the handset and the capability to send a text message. Subscribers access the invention services using a special "code" that looks like a voice short code, but behaves like an SMS short code. One code can be provided that retrieves a "Service Menu." This service menu contains a list of the services and associated dialing short codes. The subscriber can select the number (1, 2, 3, 4, etc.) associated with the menu item to access the desired service. Alternatively, the subscriber can dial the short code associated with that service to access that service directly. The menu option facilitates integration with a payment engine platform, which enables the push and pull of messages on demand and menu selection interpretation to activate the desired service.

In operation, USSD (Unstructured Supplementary Service Data) is used to send text between the user and some application. USSD should be thought of as a trigger rather than an application itself. However, it enables other applications such as prepaid. USSD is a technology unique to GSM. It is a capability built into the GSM standard for support of transmitting information over the signaling channels of the GSM network. USSD provides session-based communication, enabling a variety of applications. In operation, it is not possible to bill for USSD directly, but instead bill for the application associated with the use of USSD such as circuit switch data, SMS, or prepaid. A primary benefit of USSD is that it allows for very fast communication between the user and an application. Most of the applications enabled by USSD are menu based and include services such as mobile prepay and chat.

The disclosed architecture can provide many services to a subscriber, depending on how technical the subscriber is and how much development he or she requires. The following table summarizes some of the services that have been identified as desirable and their associated launch characteristics:

| Service | Access Code | Service Type |
| --- | --- | --- |
| Account Balance | *225# | Information Retrieval |
| Minutes Usage | *626# | Information Retrieval |
| Data Usage | *3282# | Information Retrieval |
| One-Time Payment | *113# | Transaction |
| Voicemail Password Reset | *114# | Information Retrieval |
| Internet Password | Not decided | Information Retrieval |
| Customer Care Call Back | Not decided | 2-Way Interaction |
| Credit Card Expiration | Not decided | 2-Way Interaction |
| Minutes Balance Alerts | Not decided | Alerting |

Account Balance (*225#)

This service enables a subscriber to retrieve current account balance and the date the last payment was received.

User Flow

1. Subscriber dials *225# on the handset and presses Send.

2. The services platform sends back an SMS message to the subscriber's handset containing the current balance and the date the last payment was received.

Alternative User Flow

1. Subscriber sends a SMS to 101 on the handset.

2. The service sends back an SMS message to the subscriber's handset containing the current balance and the date the last payment was received.

Text Message Verbiage—any suitable text can be provided.

Service Limitations. If the billing systems are not a real-time billing system, the account balance the subscriber receives is not real-time. Rather, the value shown is the amount on the account the last time the bill cycled through and a payment was made. The subscriber will not be able to see difference in the balance on a day-to-day basis as some daily charges are not actually applied until the bill is cycled through processing. If the billing system is real time, however, the account information is the latest on record.

Minutes Balance (*646#)

This service enables the subscriber to retrieve the number of minutes he has remaining on his account.

User Flow

1. Subscriber dials *646# on the handset and presses Send.

2. The services platform sends back an SMS message to the subscriber's handset containing the number of minutes remaining Alternative User Flow 1. Subscriber sends a SMS to 102 on the handset.

2. The service sends back an SMS message to the subscriber's handset containing the number of minutes the subscriber had and the number of minutes remaining (or used).

Data Balance (*3282#)

This service enables the subscriber to retrieve the number of data services he has remaining on his account.

User Flow

1. Subscriber dials *3282# on the handset and presses Send.

2. The services platform sends back an SMS message to the subscriber's handset containing the number of data service remaining (or used).

Alternative User Flow

1. Subscriber sends a SMS to 102 on the handset.

2. The service sends back an SMS message to the subscriber's handset containing the number of minutes the subscriber had and the number of minutes remaining (or used).

One-Time Payment (*729#)

This service enables the subscriber make a one-time payment using the credit card or account information already in his file.

SMS Flow

For SMS messaging flow, in one implementation, the following assumptions can be made: a credit card or bank account number is already on file for the subscriber; and a customer cannot send credit card number or bank account number via SMS to make a payment.

A time limit has been defined during which a payment acknowledgement should be received by the subscriber. In another implementation, the numbers can be inserted and transmitted via SMS.

User Flow

1. Subscriber dials *729# and presses Send.

2. The services platform sends back an SMS message to the subscriber's handset asking if the subscriber wants to make a payment with the payment information already on file.

3. Subscriber replies to the message with "Y" or "Yes."

4. Upon a successful transaction, the service Trigger sends an SMS to the subscriber indicating that the payment was processed.

Limitations

1. In a web-based regime, the confirmation that returns to the screen indicates the payment is being processed, and not that the payment was successful. The payments made through back-end systems are not always real-time. It may or may not also be the case with an SMS payment.

2. Error conditions—if there is no payment information on file, the transaction cannot be completed, and an error message can be provided indicating as such.

3. If a customer attempts to pay twice, error messages can be presented.

| BRID # | Comments |
|---|---|
| BR-001 | The different services are accessible using a menu. |
| BR-002 | The subscriber can initiate the services menu by dialing a short code and pressing SEND on the handset. |
| BR-003 | For GSM customers, the menu can be returned via USSD. |
| BR-004 | For TDMA customers, the menu can be returned via SMS using a QuickReach platform. |
| | USSD Menu |
| BR-005 | The USSD menu can contain the following text:<br>   Select the # of the desired service:<br>      Acct Balance (*BAL#)<br>      Minutes Remaining (*MIN#)<br>      Pay via Messaging (*PAY#)<br>Note: If unable to calculate and display the actual number of minutes remaining, option 2 can be labeled "Minutes Used." Also, the menu items will pertain to the data options only. Therefore, the *PAY via IVR may not be included on the menu. |
| BR-006 | If the subscriber replies with a menu number (1, 2, or 3), the service corresponding to that number will be initiated. |
| BR-007 | If the subscriber replies with the service short code shown on the menu, the service corresponding to that short code can be initiated. |
| BR-008 | The menu must be easy to update as new services are developed. |
| | TDMA Menu |
| BR-009 | The TDMA menu can contain at least the following text:<br>   Select the # of the desired service:<br>      Acct Balance (*BAL#)<br>      Minutes Remaining (*MIN#)<br>      Pay via Messaging (*PAY#)<br>Note: If unable to calculate and display the actual number of minutes remaining, option 2 can be labeled "Minutes Used." Also, the menu items should pertain to the data options only. Therefore, the *PAY via IVR may not be included on the menu. |

The following describes features for proactively notifying customers that their payment is overdue. Customers are allowed to respond to the Past Due notifications by making a payment instantly.

| BRID | Comments |
|---|---|
| BR-100 | Past Due Notifications will proactively inform customers when their payments are overdue. |
| BR-101 | Back-end systems will compile a listing of subscribers whose payments are overdue (an Overdue Subscribers list).<br>Note: The number of days the account is overdue can be configured according to any given application, e.g., between 5 and 10 days. |
| BR-102 | The number of days the account is overdue is an easily configurable value such that Collections and Finance departments can change the file feed as necessary to retrieve accounts based on the "Overdue X Days" value they desire. |
| BR-102a | The number of days the account is overdue is modifiable via a tables change and is changeable on a market-by-market basis. |
| BR-103 | The number of days the account is overdue is configurable such that each billing system can have a different value to accommodate the differences in the billing systems. |
| BR-104 | The subscribers included in the Overdue Subscribers list can meet the following conditions:<br>   Account Type is Individual without combined bill |
| BR-105 | In the Overdue Subscribers list the following information can be provided for each subscriber:<br>   Mobile Number<br>   Total Balance Due (Current Balance + All Overdue Amounts) |
| BR-106 | This list of subscribers can be sent automatically to the services platform on a daily basis. All subscribers can be contained in a single file. |
| BR-107 | The services platform can send SMS or USSD messages to the customers in this list indicating that their payments are now past due. |
| | USSD Experience |
| BR-108 | For GSM customers, the services platform can send the following message to the overdue customers.<br>   Our records indicate that your balance of $0.00<br>   is now overdue. To make a payment now,<br>   please select Continue.<br>   Continue                    Cancel |
| BR-109 | If the subscriber selects Cancel, the messaging process exits and the subscriber receives a message stating the following:<br>   Payment not sent. Please dial *PAY to make a payment. |
| BR-110 | If the subscriber selects Continue, the payment request using payment information on file is sent to Quickpay to process the payment. |
| BR-111 | After a payment request has been sent, the subscriber can receive an SMS confirmation indicating the following:<br>   Thank you. We are currently processing your payment. |
| | TDMA Experience |
| BR-112 | For TDMA Customers:<br>If the customer has a valid account type and has payment information already stored, the services platform can send the subscriber the following message:<br>   Our records indicate that your balance of $0.00<br>   is now overdue. To make a payment now,<br>   please reply to this message with "yes" in the text. |
| BR-113 | If the customer replies to the message with "yes" in the text of the message, the services platform forwards the payment request. |

-continued

| BRID | Comments |
|---|---|
| BR-114 | If the customer replies to the message with anything else other than "yes", the services platform returns the following message:<br>   We do not recognize your reply. Please reply to previous message with "yes" in the text message field. |
| BR-115 | After a payment request has been sent back to QuickPay, the services platform sends a "Thank You" message to the subscriber's handset. This message can say the following:<br>   Thank you for your request. Your payment is being processed. Your payment confirmation may take up to 24 hours.<br>Final Confirmations |
| BR-116 | After a payment request has been sent, a confirmation SMS message is also sent<br>to the subscriber's handset indicating that the payment information has been received.<br>Note: For both GSM and TDMA customers, the confirmation can be sent via SMS so that the subscriber can store it. |

Following are details for making payments completely via data, with no IVR interaction.

| BRID | Comments |
|---|---|
| BR-200 | The subscriber will initiate the Payment service by dialing the short code *PAY# and pressing SEND on the handset. |
| BR-201 | The Trigger Platform forwards the payment request to the services platform. |
| BR-202 | The services platform will retrieve the following information from the appropriate billing system using the CTN passed in the triggered message:<br>   Account Type/Account SubType<br>   CombinedBillStatus<br>   Total balance due on account.<br>   Indicator for whether or not payment information is on file for the subscriber.<br>   Indicator for which payment method was most recently used (Credit card or bank account).<br>   Last 4 digits of the most recently used payment method |
| BR-203 | The services platform will use the Account Type/Account SubType and the CombinedBillStatus fields to determine if customers have an account not supported by this application or if they have a combined bill. In one implementation, only individual consumer account types can use this service, and only if they do not have combined billing. |
| BR-204 | If the customer does not have a valid account type for this service or if the customer has combined billing, the services platform can send back a message stating the following:<br>   We are unable to provide this service for this account. Please dial 611 on your wireless phone for assistance. |
| BR-205 | The billing systems provide the total balance due on the account, including all past due balances that apply, or the total balance should be calculated for the subscriber before data leaves Cingular so that the QuickReach platform does not have to perform the calculation.<br>Regardless of whichever system calculates the total balance due, CAM sends that total balance due as a single value back to services platform |
| BR-206 | If a Payment Stored Indicator indicates that there is no information stored for the subscriber, the subscriber is not able to make a payment using this particular service. In this situation, the services platform sends back to the subscriber the following message:<br>   No payment method is stored on your account. Please dial *PAY to make an automated payment. The payment info you enter will be stored for future payments.<br>USSD Experience |
| BR-207 | For GSM Customers:<br>If the customer has a valid account type and sub type (TLG only), and has payment information already stored, the services platform sends the subscriber the following message:<br>   Your current balance<br>   is $X.XX.<br>   Select Continue to<br>   make a payment<br>   Using your [Credit Card/Bank Account]<br>   Ending in XXXX.<br>   Continue              Cancel |

-continued

| BRID | Comments |
|---|---|
| BR-208 | If the subscriber selects Cancel, the payment messaging process exits, and the subscriber receives a message stating the following:<br>Your payment request has been cancelled. |
| BR-209 | If the subscriber selects Continue, the payment request using information on file is sent to process the payment. |
| BR-210 | After a payment request has been sent, the subscriber receives an SMS confirmation indicating the following:<br>Thank you. We are currently processing your payment. |

TDMA Flow

| BRID | Comments |
|---|---|
| BR-211 | For TDMA Customers:<br>If the customer has a valid account type and sub type (TLG only), and has payment information already stored, services platform sends the subscriber the following message:<br>Your current balance<br>is $X.XX.<br>Reply to this msg<br>with the text "yes"<br>to make a payment<br>using your [Credit Card/Bank Account]<br>ending in XXXX.<br>The text "Credit Card" or "Bank Account" is displayed according to the payment type indicated in the file feed. |
| BR-212 | If the customer replies to the message with "yes" in the text of the message, the services platform forwards the payment request to Quickpay. |
| BR-213 | If the customer replies to the message with anything else other than "yes", the services platform returns the following message:<br>We do not recognize your reply. Please reply to previous message with "yes" in the text message field. |
| BR-214 | After a payment request has been sent back to QuickPay, the services platform sends a "Thank You" message to the subscriber's handset. This message should say the following:<br>Thank you for your request. Your payment is being processed. Your payment confirmation may take up to 24 hours. |

Final Confirmations

| BRID | Comments |
|---|---|
| BR-215 | After a payment request has been sent, a confirmation SMS message is also sent to the subscriber's handset indicating that the payment information has been received.<br>Note: For both GSM and TDMA customers, the confirmation can be sent via SMS so that the subscriber can store it. |
| BR-216 | If during payment processing the back-end systems encounter a problem (i.e. insufficient funds, expired credit card, etc.), the customer will receive an SMS indicating that there was a problem with the payment and requesting that the customer contact Customer Care.<br>Note: This SMS is not immediate since payment processing issues may not be discovered until batch processes are executed well after the subscriber has made a payment request. |

Reporting

| BRID | Comments |
|---|---|
| BR-217 | The *PAY# solution provides reporting capabilities that track the following:<br>Number of Payment Attempts<br>Number of Successful Payments |

The following describes the SMS payment confirmation that can be sent when a customer makes a payment.

| BRID | Comments |
|---|---|
| BR-300 | If a customer makes a payment through any of the following methods, an SMS payment confirmation can be sent to the customer's handset:<br>Payment via services IVR.<br>Payment via services Payment Messaging (*PAY#)<br>Payment via regular IVR |
| BR-301 | The SMS confirmation can be sent under at least the following conditions:<br>Payment was successfully processed.<br>Payment was not successfully processed.<br>Payment was rejected. |
| BR-302 | If the payment was successfully processed into QuickPay, the subscriber receives an SMS confirmation. Example:<br>A payment of $X.XX was posted to your account on mm/dd/yy. Thank you for your payment.<br>Do not reply to this message. |

| BRID | Comments |
|---|---|
| BR-303 | If the payment was NOT successfully processed because the services platform could not communicate with QuickPay, services platform sends an SMS notification as follows:<br>We were unable to process your payment submitted on mm/dd/yy. Please dial 611 for assistance.<br>Do not reply<br>Note: Delivery Receipts from QuickPay can be used to ensure that the payment request message as actually delivered. |
| BR-304 | If the payment was rejected for non-sufficient funds or similar reasons, the SMS confirmation can appear as follows, depending on what the payment type is:<br>Credit Card:<br>We were unable to process your credit card payment request of $X.XX. Please dial 611 for assistance.<br>Do not reply.<br>Bank Account:<br>We were unable to process your check payment request of $X.XX. Please dial 611 for assistance.<br>Do not reply. |
| BR-305 | The following reasons codes will be sent back if the payment is rejected. If the payment fails and one of the following reason codes is NOT returned, the failure is due to a system error and not a payment reject. |

| ACH Return Code | ACH Return Code Description |
|---|---|
| R01 | Insufficient Funds (NSF) |
| R02 | Account Closed |
| R03 | No Account/Unable to Locate Account |
| R04 | Invalid Account Number |
| R07 | Authorization Revoked by Customer |
| R08 | Payment Stopped |
| R09 | Uncollected Funds (NSF) |
| R10 | Customer Advises Not Authorized. (likely disputing amount) |
| R12 | Branch sold to another DFI |
| R15 | Deceased |
| R16 | Account Frozen |
| R20 | Non-transaction Account (includes credit unions) |
| R29 | Corp Customer Advises Not Authorized |
| Misc | Miscellaneous |

This section details the requirements modifying the *MIN# display to show the number of minutes the customer has remaining

| BRID | Comments |
|---|---|
| BR-401 | The *MIN# display displays the number of minutes remaining for each category of minutes available on the account. |
| BR-402 | When a customer retrieves his/her Minutes data via *MIN#, rollover minutes the customer has remaining on his/her account can be included in the display |
| BR-403 | The minutes displayed on the *MIN# message back is the number of minutes remaining in each category, not the number of minutes as of the last bill cycle or the number of minutes used.<br>See below:<br>MINs Remaining<br>From: 11/11-12/31<br>Anytime: 900<br>Rollover: 500<br>N&W: 300<br>M2M: 400<br>XX RO set to expire XX/XX/XX |
| BR-404 | The From dates are as of the current date through the end of the bill cycle. |

Following is a description of an alternative implementation of the subject invention. Here, customers have MO (mobile originating) and MT (mobile terminating) administrative SMS provisioned on their accounts.

| BRID | Comments |
|---|---|
| BR-001 | GSM customers can access the services using existing USSD technology. |
| BR-002 | TDMA customers will access the four services using a proprietary TDMA solution. |
| BR-003 | The user experience for initiating the Services is consistent across both GSM and TDMA. However, the method for sending information back to the subscriber may differ between GSM and TDMA to take advantage of the simplicity of USSD wherever possible. |
| BR-004 | GAIT customers can use these services on both TDMA and GSM networks. However, GAIT customers roaming off net in a TDMA network may not be supported. In one implementation, they are able to access these services while roaming on a TDMA network. |
| BR-005 | Services consists of the following four services:<br>*225#—Balance Inquiry<br>*646#—Minutes Remaining Inquiry<br>*729#—Payment<br>*3282#—Data |

-continued

| BRID | Comments |
|---|---|
| BR-008 | If these services are based on some type of data service with on-screen messaging, latency of up to 10 seconds during peak traffic time can occur and is acceptable. |
| BR-009 | Any keying sequence required for these services is easy to remember. |
| BR-010 | Services are accessible without requiring navigation through a lot of menus. |
| BR-011 | The customer can access a particular service by dialing the short code associated with the service and pressing SEND on their handsets. |
| BR-012 | A dialed short code requests the associated data and sends the information back to the handset in an SMS or USSD, depending on technology. In GSM, when the message returned does not include data that should be stored by the user (i.e. a confirmation message), the message is returned via USSD. |
| BR-013 | The data displayed back to the customer is easily read and understood across TDMA and GSM as well as across all handset models. |

This section details the requirements modifying the *DATA# display to show the number of data service the customer has remaining

| BRID | Comments |
|---|---|
| BR- | The *DATA# displays the number of minutes remaining for each category of data services available on the account. |
| BR | The information displayed on the *DATA# message back is the number of data remaining in each category, not the number of data services as of the last bill cycle or the number of data services used. See below:<br>Data Remaining<br>From: 11/11<br>TXT/IM: 400<br>MMS: 50<br>MEdia Net/Internet: 1.2 MB |
| BR-404 | The From dates are as of the current date |

This section details the features for this alternative embodiment services:
*225#—Balance Inquiry
*646#—Minutes Remaining Inquiry
*729#—Payment Using #PAY Functionality
*103—Payment Using Ultimate Voice/IVR Design
*103—Payment Using SMS (No Voice/IVR)
*1 Services Menu

| BRID | Comments |
|---|---|
| | *225#—Balance Inquiry |
| BR-101 | A customer can access his account balance information by dialing *225# and pressing SEND on his handset. |
| BR-102 | When the customer sends the Balance short code, the network triggering platform accesses the existing CAM interface to obtain the account balance information. |
| BR-103 | Balance information is sent to the customer's handset via USSD for GSM customers and via SMS for TDMA customers. |
| BR-104 | The account balance information does not have to be real-time, given the limitations of the billing systems. Balance shown can be the balance as of the last bill cycle and includes any payment made since then. In one implementation, the balance does not include daily charges like calls to Directory Assistance, etc. |
| BR-105 | The account balance information includes the date the last payment was received. |
| BR-106 | The Balance Inquiry functionality supports at least two times the current volume that current systems (IVR, Web, Customer Care) are receiving today. |

| BRID | Comments |
|---|---|
| | Note: IVR usage is not the only driver because there are other ways to get to these systems other than the IVR. The invention scales according to ALL the ways the customers obtain this info.<br>*646#—Minutes Remaining |
| BR-107 | A customer can access his Minutes Remaining information by dialing *646# and pressing SEND on his handset. |
| BR-108 | When the customer sends the Minutes Remaining short code, the network triggering platform accesses the existing CAM interface to obtain the minutes remaining information. |
| BR-109 | The Minutes Remaining information is sent to the subscriber's handset via USSD for GSM and via SMS for TDMA customers. |
| BR-110 | The Minutes information can include at least the following details, if applicable on the customer's plan:<br>Remaining Minutes (includes minutes remaining on plan and any<br>rollover minutes)<br>Nights and Weekend Minutes<br>Mobile-to-Mobile Minutes |
| BR-111 | In one implementation, the minutes remaining information is not real-time. In one system, the minutes information is accurate within about 15 minutes. For another system, the information accurate within about 24 hours.<br>Note: The 24 hours commitment may be exceeded for extended footprints and roaming. |
| BR-112 | The Minutes Remaining data returned to the handset can be formatted in any suitable manner. |
| BR-113 | On each message returned, legal caveat can be included such as: "See www.cingular.com for terms."<br>*729—Payment via Voice Using *#PAY Functionality—First Embodiment |
| BR-114 | The subscriber can make a payment by dialing *729# and pressing SEND on his handset. |
| BR-115 | The system puts the customer into the existing IVR at the payment option. |
| BR-116 | The IVR provides the customer with his current balance information. |
| BR-117 | The IVR prompts the customer to enter in a Credit Card or Bank Account information for payment.<br>Voice recognition can also be employed.<br>*729—Payment via Voice—Second Embodiment |
| BR-118 | The subscriber initiate the Payment service by dialing the short code *729# and pressing SEND on the handset. |
| BR-119 | The response is delivered via IVR (voice). The Payment IVR recognizes the phone caller ID and immediately prompts the customer with the current balance. |
| BR-120 | The IVR does a lookup on the subscriber's mobile number and determines whether or not he has payment information on file. |
| BR-121 | If the customer has payment information on file, the IVR prompts him to press 1 to pay the balance due using the payment information on file. |
| BR-122 | If the customer presses 1, the IVR provides a confirmation that the payment request was sent.<br>Note: In one implementation, the "Thank You" indicates that the payment information was sent. In another implementation, the "Thank You" indicates that the payment was actually made. Where backend systems are not real-time it is not indicated that the payment itself was successful, but only the transfer of payment information. |
| BR-123 | If during payment processing the back-end systems encounter a problem (i.e. insufficient funds, expired credit card, etc.), the customer receives an SMS indicating that there was a problem with the payment and requests that the customer contact Customer Care.<br>Note: This SMS is not immediate since payment processing issues may not be discovered until batch processes are executed well after the subscriber has made a payment request. |
| BR-124 | If the customer does NOT have payment information on file, the IVR prompts him as follows:<br>"If you would like to pay your balance using a Debit/Credit Card, press 1. If you would like to pay using a check or bank account, press 2." |
| BR-125 | With either response, the IVR will prompt the customer to enter the appropriate information. |
| BR-126 | The IVR will then store the customer's payment information. The IVR thanks the customer for their payment. |

-continued

| BRID | Comments |
|---|---|
| BR-127 | The IVR indicates that the payments are not automatic or recurring. The customer initiates each monthly payment. |
| BR-128 | After a subscriber has successfully submitted his payment request, an SMS message is sent back to the customer indicating that the payment request has been received. This SMS also indicates that the payment is pending processing. Legal information can also be included. |

*103—Payment via USSD

| BRID | Comments |
|---|---|
| BR-129 | The GSM subscriber initiates the Payment service by dialing the short code *103# and pressing SEND on the handset. |
| BR-130 | The Trigger Platform accesses the back-end systems to retrieve current balance information for the subscriber, based on the mobile number from which the service was initiated. |
| BR-131 | The Trigger Platform forwards the balance information via USSD message. This message can contain the subscriber's current account balance information. This message can also instruct the subscriber to Press 1 to pay balance due using payment information on file, or press 2 to enter new information. |
| BR-132 | If the subscriber selects option 1, the payment request using information on file is sent to the back-end systems that process payments. |
| BR-133 | If the subscriber presses 2 to enter payment information, a USSD message is returned prompting the customer to enter Debit/Credit Card number or bank account number. |
| BR-134 | After the subscriber enters his credit card/bank account number and presses SEND, the payment request is sent to the back-end systems that process payments. |
| BR-135 | After a payment request has been sent, the system sends a "Thank You" message via USSD (GSM subscriber) or SMS (TDMA subscriber) to the subscriber's handset. |
| BR-136 | After a payment request has been sent, a confirmation SMS message is also sent to the subscriber's handset indicating that the payment information has been received. Note: For both GSM and TDMA customers, the confirmation can be sent via SMS so that the subscriber can store it. |
| BR-137 | If during payment processing the back-end systems encounter a problem (i.e. insufficient funds, expired credit card, etc.), the customer will receive an SMS indicating that there was a problem with the payment and requesting that the customer contact Customer Care. Note: This SMS message may not be immediate since payment processing issues may not be discovered until batch processes are executed well after the subscriber has made a payment request. |
| BR-138 | This payment option can be available to all GSM customers, even while roaming, even while off network. |

*1 Service Menu

| BRID | Comments |
|---|---|
| BR-139 | The different services are accessible using a menu. |
| BR-140 | The subscriber initiates the services menu by dialing the short code *10# and pressing SEND on the handset. |
| BR-141 | For GSM customers, the menu will be returned via USSD. |
| BR-142 | For TDMA customers, the menu will be returned via SMS. |
| BR-143 | The menu contains the following text:<br>Select the # of the desired service:<br>  Acct Balance (*101#)<br>  Minutes Remaining (*102#)<br>  Data Remaining<br>  Make Payment (*103#) |
| BR-144 | If the subscriber replies with a menu number (1, 2, or 3), the service corresponding to that number is initiated. |
| BR-145 | If the subscriber replies with the service short code shown on the menu, the service corresponding to that short code is initiated. |
| BR-146 | The menu must is easily updateable as new services are developed. |

The billing and payment system is one exemplary aspect of the *Services described above. The description in the following sections pertains to how the customer is provisioned for the product, and what systems will be affected. Here, all customers have MO (mobile originate) and MT (mobile terminate) administrative SMS provisioned on their accounts.

Figure 4:
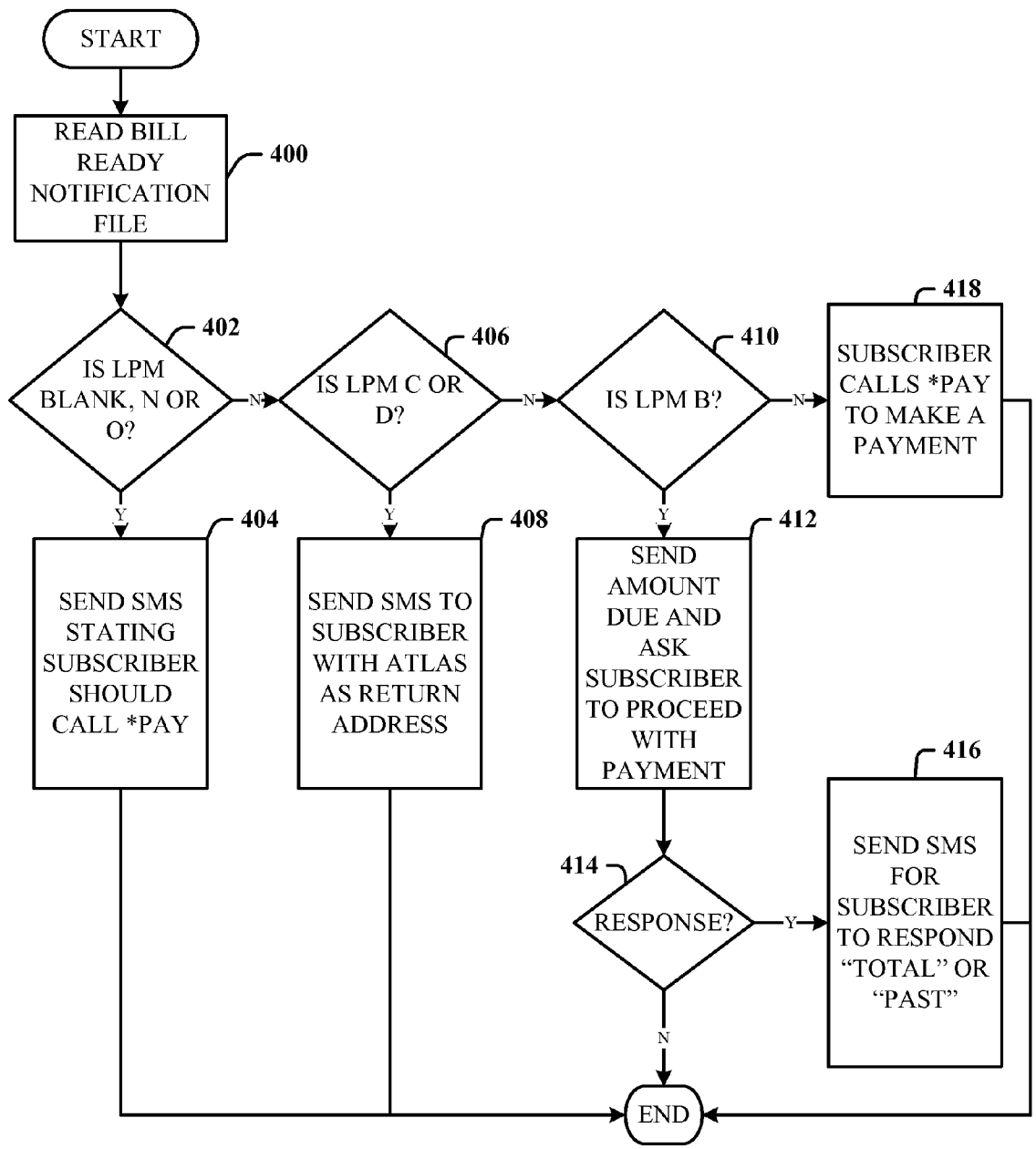
FIG. 4 illustrates a methodology of payment processing by the payment engine in accordance with the invention.

FIG. 4 illustrates a methodology of payment processing by the payment engine in accordance with the invention. The telecommunications carrier compiles a listing of subscribers whose bills are available for payment and who have opted-in (subscribed) to receive bill ready notifications. This listing of subscribers is referred to as a Bill Ready Notification File and is transferred to a messaging service. At 400, a specific user's file is parsed and read by the messaging service to determine the corresponding last payment method (LPM) user data. At 402, the process determines whether the LPM is blank, or indicates an N or an O. A blank or an N (N=Null) indicates that no last payment method is recorded on file for the subscriber and an O (O=Opt out) indicates that the user has opted out or does not wish to subscribe to receive bill ready notifications. If it is determined that the LPM is blank, or indicates an N or an O, then at 404 the messaging service sends an SMS message stating that the user should call *PAY to make a payment.

If it is determined that the LPM is not blank, or does not indicate an N or an O, then at 406 the process determines whether the LPM indicates an C. An C (C=Credit card) indicates that the user paid the last bill via a credit card. If it is determined that the LPM indicates an C, then at 408 the messaging service sends an SMS message to the user with the carrier's customer care messaging manager (e.g., ATLAS) listed as the return address. The user then responds to the SMS message in the affirmative to pay the account balance via the credit card listed on file.

If it is determined that the LPM is not blank, and does not indicate an N, an O or an C, then at 410 the process determines whether the LPM indicates an B. An B (B=Bank account) indicates that the user paid the last bill via a bank account. If it is determined that the LPM indicates an B, then at 412 the messaging service (e.g., Air2Web) sends an SMS message to the user with the specific amount due and asks if the user would like to proceed. At 414, the user responds to the messaging service. If the user responds in the negative, then bill pay is terminated. If the user responds in the affirmative, then at 416 another SMS message is sent to the user with a request asking the user if the "Total" amount due or just "Past" due amount should be paid. This SMS message contains the carrier's customer care messaging manager listed as the return address. The user then responds to the SMS message in the affirmative and specifies "Total" or "Past" to pay the account balance via the bank account listed on file.

In all other cases, at 418 the messaging service sends an SMS message to the user stating that the user should call *PAY to make a payment. At this time, the user can dial *PAY to make the automated payment and can then enter payment information (e.g., credit card number or bank account number) to be stored for future payments.

Figure 5:
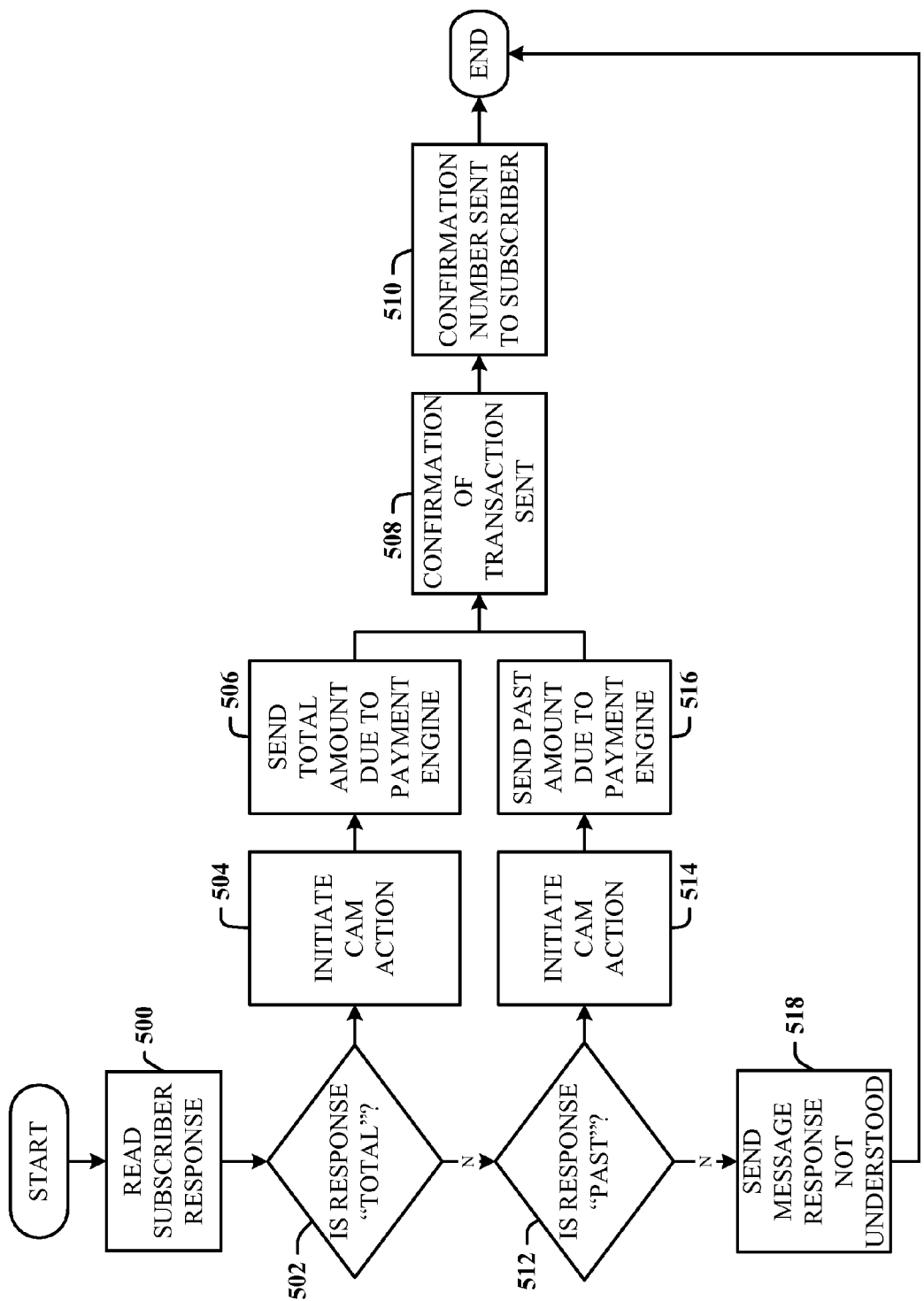
FIG. 5 illustrates a methodology of processing a subscriber-initiated payment in accordance with the invention.

FIG. 5 illustrates a methodology of processing a subscriber-initiated payment in accordance with the invention. At 500, the carrier's customer care messaging manager (e.g., ATLAS) reads the user's response to the Bill Ready Notification specifying whether the "Total" amount due or just the "Past" due amount should be paid. At 502, if it is determined that the user's response was "Total", then at 504 the CAM (customer account manager) is initiated. The CAM retrieves the total balance due on the account and other user-specific information, (e.g., account type, account number, bill status, etc.). At 506, the CAM sends the total balance due to an accounts system/payment engine (e.g., QuickPay), which processes the transaction. At 508, the payment engine sends a confirmation of the transaction to the CAM, and at 510 a confirmation number is sent to the user.

At 512 it is determined that the user's response was "Past", then at 514 the CAM is initiated. The CAM retrieves the past balance due on the account and at 516, the CAM sends the past due balance amount to the payment engine which processes the transaction. At 508, the payment engine sends a confirmation of the transaction to the CAM, and at 510 a confirmation number is sent to the user.

If it is determined that the user's response was not "Total" or "Past", then at 518 the carrier sends the user a message stating that the response was not understood. The user can then re-enter a response of "Total" or "Past" or opt to cancel the payment process altogether.

Figure 6:
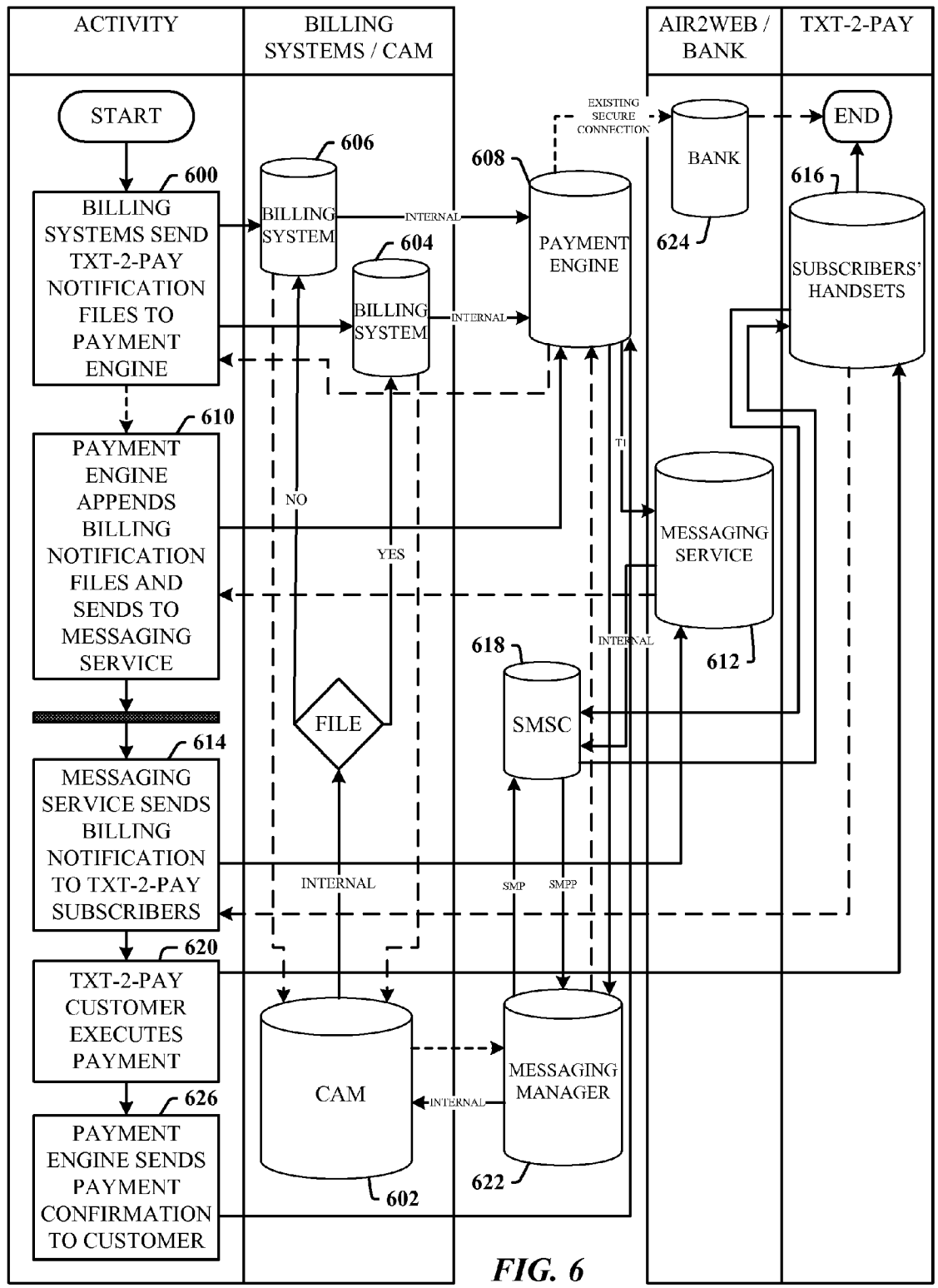
FIG. 6 illustrates a flow diagram where the system employs SMSC in accordance with the invention.

FIG. 6 illustrates a flow diagram where the system employs the SMSC (short message service center) in accordance with the invention. At 600, the billing systems send bill-ready notification files to the accounts system/payment engine (e.g., QuickPay). Specifically, the telecommunication carrier's CAM (customer account manager) 602 compiles a listing of subscribers from various billing systems (e.g., CARE 604 and Telegence 606) whose bills are available for payment (a Bill-Ready Subscribers list) and sends the bill-ready files to the payment engine (e.g., QuickPay) 608. At 610, the payment engine appends last payment method (LPM) data to the bill-ready notification files and sends them to the messaging service (e.g., Air2Web) 612. At 614, the messaging service 612 then sends the bill-ready notification files to the subscriber's mobile handset 616 via SMS messages from the SMSC 618. The bill-ready notification files are sent to subscribers as text messages on their mobile handsets 616.

Then at 620, the subscribers execute payment of the bill-ready notification files either by credit card or bank account. If payment is executed via credit card, the messaging service 612 sends an SMS message to the user with the carrier's customer care messaging manager (e.g., ATLAS) 622 listed as the return address. The user then responds to the SMS message in the affirmative to pay the account balance via the credit card listed on file. The payment engine 608 processes the transaction and at 626 sends a payment confirmation to the subscriber once the transaction is complete.

If payment is executed via a bank account, the messaging service 612 sends an SMS message to the user with the specific amount due and asks if the user would like to proceed. If the user responds in the affirmative, then the response is sent back to the messaging service 612. The affirmative response triggers the messaging service 612 to send a Legal message to the subscriber. The Legal message contains a general statement such as, "By replying to this message, I authorize my bank to deduct from my bank account this one-time payment of my telecommunications carrier bill." The subscriber then sends an affirmative response to the Legal message to the customer care messaging manager 622 via an SMS message. The payment engine 608 then processes the transaction and deducts from the specified bank account 624 a one-time payment for the account balance. At 626 the payment engine 608 sends a payment confirmation to the subscriber once the transaction is complete.

Figure 7A:
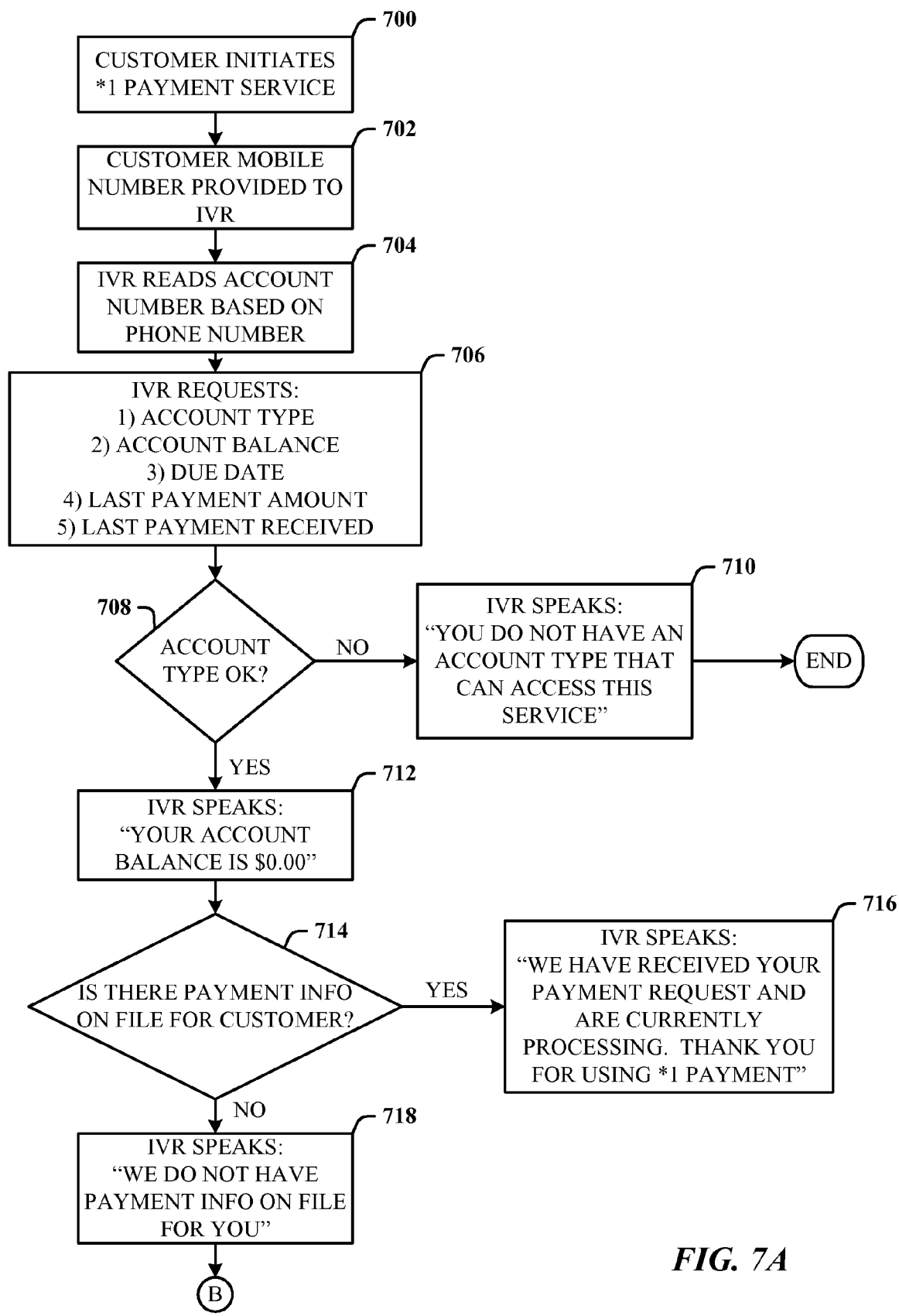
FIG. 7A and FIG. 7B illustrate a flow diagram of a methodology for IVR payment in accordance with the invention.
Figure 7B:
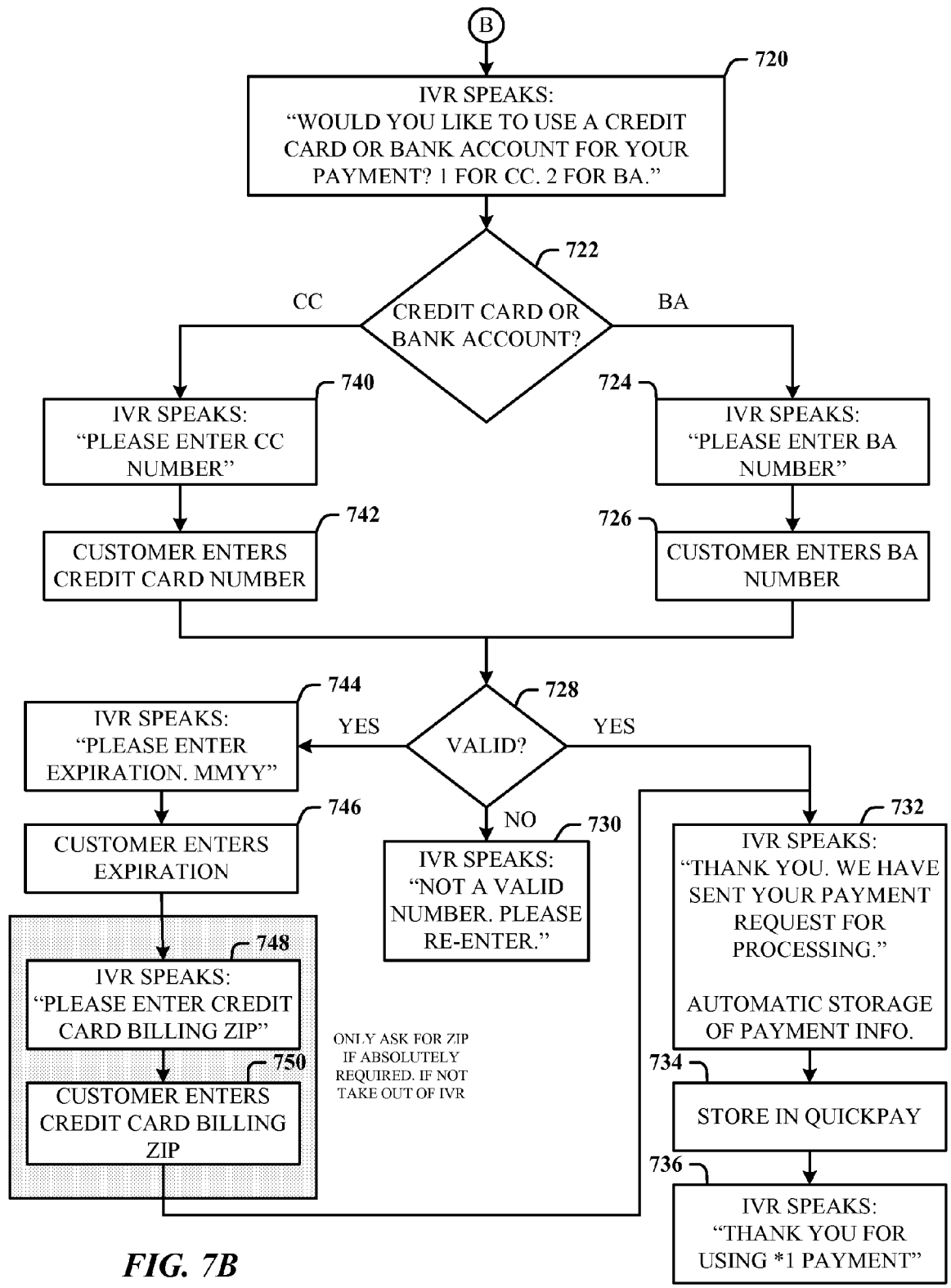

FIG. 7A and FIG. 7B illustrate a flow diagram of a methodology for IVR (interactive voice response) payment in accordance with the invention. A subscriber can make a payment via an IVR process by using the *1 PAY Functionality. At 700, the subscriber initiates the IVR service by dialing *1 and pressing SEND for Payment Services. At 702, the subscriber's mobile telephone number is provided to the IVR. At 704, the IVR then processes/reads the account number corresponding to the mobile number. At 706, the IVR requests specific data from the account, such as Account Type, Account Balance, Due Date, Last Payment Amount, and/or Last Payment Received. At 708, the IVR verifies if the Account Type is valid. If the account type is not valid, then at 710 the IVR states "You do not have an account type that can access this service," and the process is terminated. If the account type is valid, then at 712 the IVR states the requested account balance amount.

At 714, the IVR determines if payment information is on file for the account. If payment information is on file, then at 716 the IVR states "We have received your payment request and are currently processing the request. Thank you for using *1 Payment." If payment information is not on file, then at 718 the IVR states that payment information is not available for the account. At 720, the IVR asks if the subscriber would like to use a credit card or bank account for completing the transaction. At 722, the subscriber chooses a credit card or bank account to use in making the payment.

If a bank account is used, at 724 the IVR requests the bank account number. At 726, the subscriber enters the bank account number and at 728 the IVR verifies the account validity. If invalid, at 730 the IVR states "Not a valid account number, please re-enter." If valid, at 732 the IVR processes the payment and automatically stores the subscriber's payment information. At 734, the bank account number is stored in the payment engine (e.g., QuickPay). At 736, the IVR states "Thank you for using *1 Payment". If the subscriber does not want their payment information stored in the payment engine, then the subscriber can call a customer service representative (CSR) of the telecommunication carrier and request that the payment information be removed.

If a credit card is used, at 740 the IVR requests the credit card number. At 742, the subscriber enters the credit card number and at 728 the IVR verifies the account validity. If invalid, at 730 the IVR states "Not a valid number, please re-enter." If valid, at 744 the IVR requests the expiration date. At 746, the subscriber enters the expiration date. Then, if required, at 748 the IVR requests the credit card billing zip code. At 750, the subscriber enters the credit card billing zip code and the payment is processed. At 732, the IVR processes the payment and automatically stores the subscriber's payment information. At 734 the credit card number is stored in the payment engine (e.g., QuickPay). At 736, the IVR states "Thank you for using *1 Payment". If the subscriber does not want their payment information stored in the payment engine, then the subscriber can call a CSR of the telecommunication carrier and request that the payment information be removed.

The requirements described in this section pertain to the networking considerations for the product. This section also includes requirements pertaining to the technical support necessary for the product or service. For a TDMA services network, see FIG. 8, et. seq.

| BRID | Comments |
| --- | --- |
| BR-300 | All TDMA switches can be translated to recognize the services short codes. |
| BR-301 | Once the services short codes are in the switch, the TDMA switches convert them to SS7 messages directed to the central service Trigger platform. |
| BR-302 | The Trigger Platform releases the call to eliminate any airtime usage. |

Figure 8:
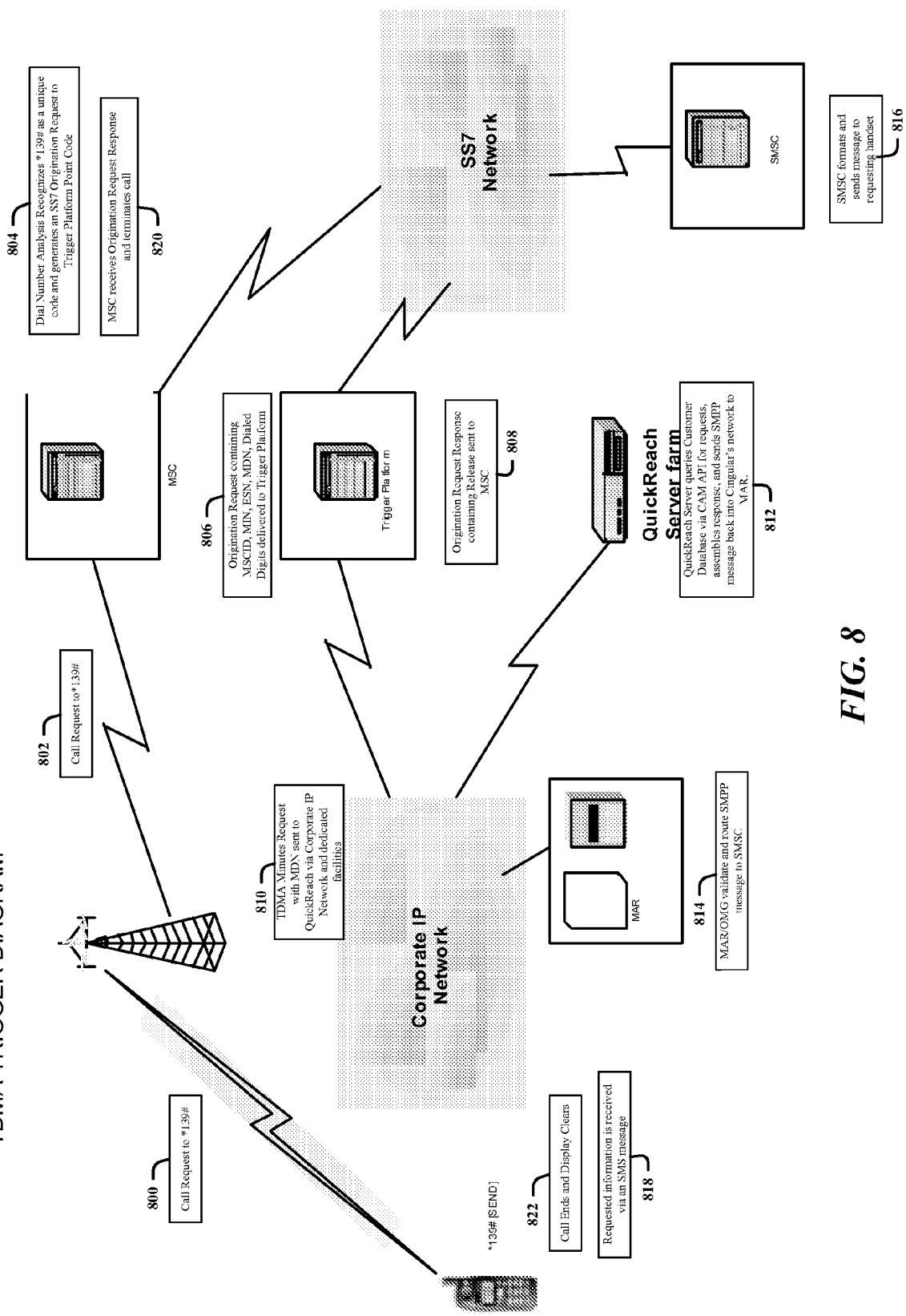
FIG. 8 illustrates a TDMA trigger system diagram in accordance with the invention.

FIG. 8 illustrates a TDMA trigger system diagram in accordance with the invention. At 800, a subscriber utilizes a mobile handset to initiate a Call Request signal using a character set (e.g., *139#), and then presses a SEND command. At 802, the base station receives the Call Request signal and forwards it to the MSC (mobile switching center). At 804, Dial Number Analysis processing recognizes the character set *139# as a unique code and generates an SS7 Origination Request to Trigger Platform Point Code. At 806, the Origination Request containing the MSCID, MIN, ESN, MDN and Dialed Digits is delivered to the Trigger Platform. At 808, the Origination Request Response containing a Release signal is sent to the MSC.

At 810, a TDMA Minutes Request with MDN is sent to the server farm (e.g., QuickReach Server farm) via the Corporate IP Network and dedicated facilities. At 812, the QuickReach Server queries the Customer Database via a CAM API (customer account manager application protocol interface) for requests, assembles the response, and sends the SMPP message back into the telecommunication carrier's network to a MAR (messaging applications router). At 814, the MAR/OMG validates and routes the SMPP message to the SMSC (short messaging service center). At 816, the SMSC formats and sends the message to the requesting mobile handset. At 818, the requested information is received via an SMS message from the SMSC. At 820, the MSC receives the Origination Request Response and terminates the call. And at 822, the call ends and the display clears.

Figure 9:
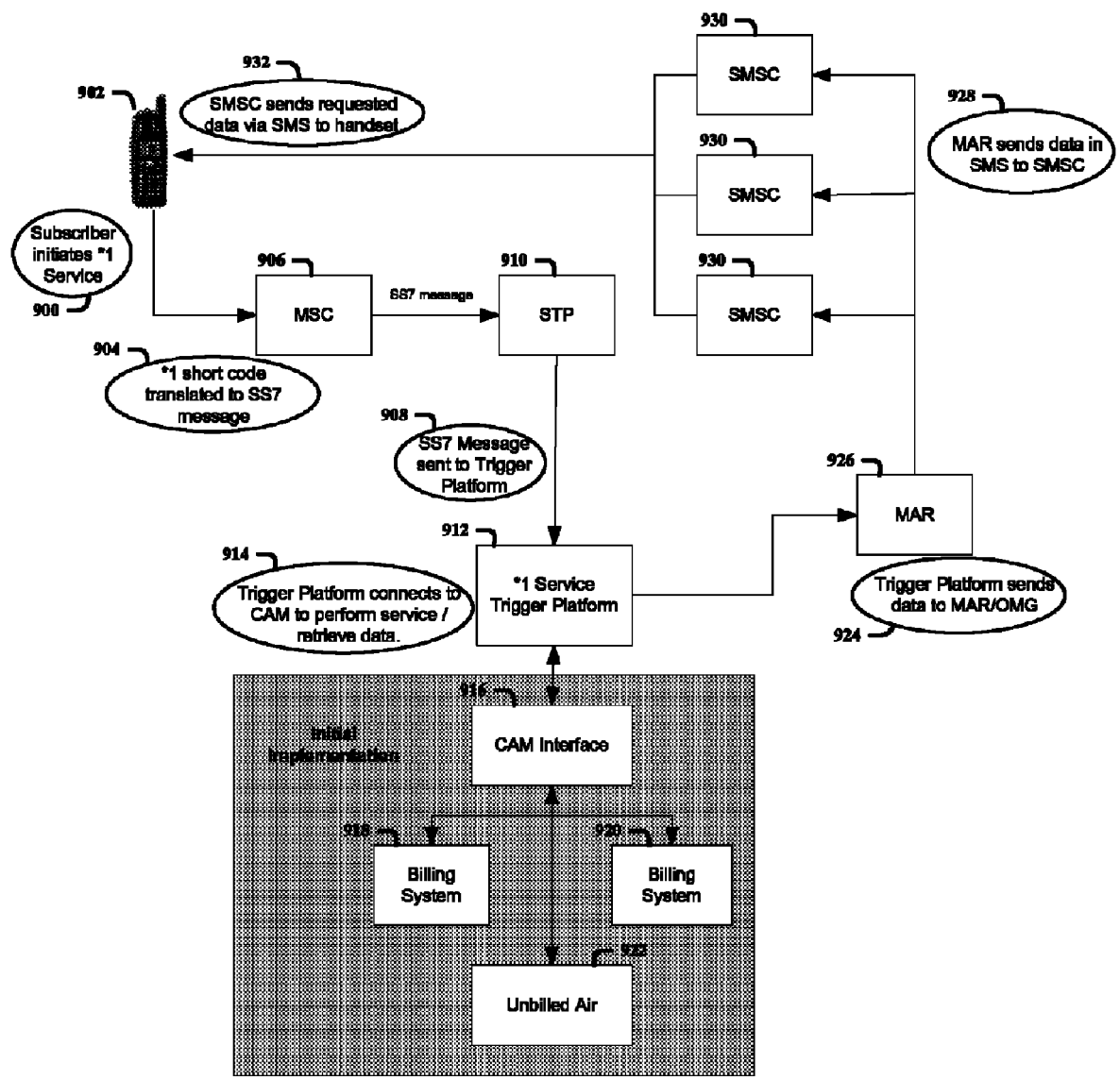
FIG. 9 illustrates an exemplary TDMA services network in accordance with the invention.

FIG. 9 illustrates an exemplary TDMA services network in accordance with the invention. TDMA translations can be built to recognize specific "dialed digits" and convert them into SS7 messages directed to a central platform. The central "trigger" platform can immediately release the call (eliminating any airtime usage). The central "trigger" platform can process a request to Information Technology (IT) for customer information and delivery to handset or pass request onto other system for processing and delivery. Customer information delivery method will be SMS messages.

Specifically, at 900 a subscriber initiates a Service Request signal using a character set (e.g., *1), and then presses a SEND command on the mobile handset 902. At 904, the *1 short code (dialed digits) is then translated to an SS7 message at the MSC 906. At 908, the SS7 message is sent to the Trigger Platform 912 via the STP 910. Then at 914, the Trigger Platform 912 connects to the CAM (customer account manager) interface 916 to perform the requested service and retrieve data. The CAM interface 916 communicates with the billing systems (e.g., CARE 918 and Telegence 920) to retrieve data and utilizes any unbilled air 922 from the subscriber account to process and perform the Service Request. At 924, the Trigger Platform sends the data to the MAR/OMG (messaging applications router/open messaging gateway). At 928, the MAR 926 then sends the data in SMS messages to the SMSC 930. And at 932, the SMSC 930 sends the requested data via SMS message to the mobile handset 902.

Figure 10:
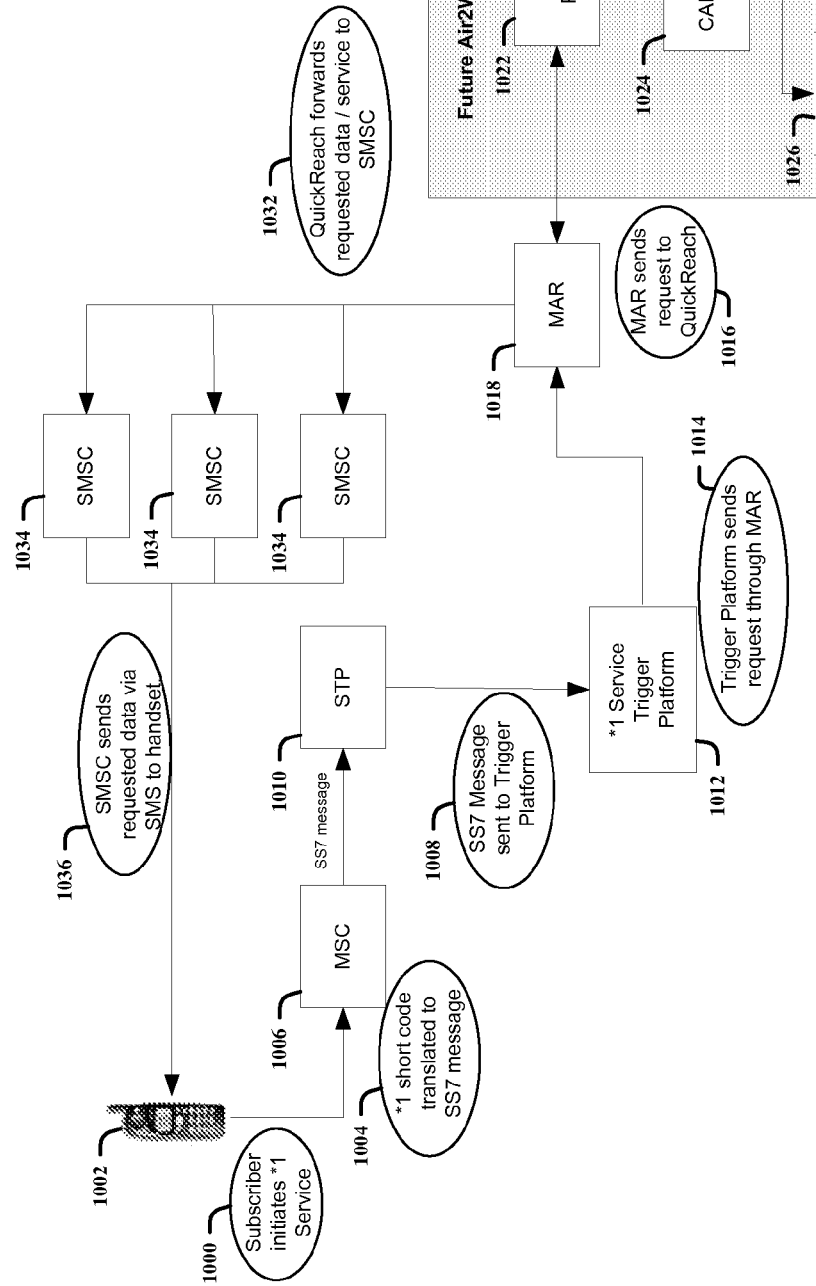
FIG. 10 illustrates an alternative TDMA services network in accordance with the invention.

FIG. 10 illustrates an alternative TDMA services network in accordance with the invention. At 1000, a subscriber initiates a Service Request signal using a character set (e.g., *1), and then presses a SEND command on the mobile handset 1002. At 1004, the *1 short code (dialed digits) is then translated to an SS7 message at the MSC 1006. At 1008, the SS7 message is sent to the Trigger Platform 1012 via the STP 1010. At 1014, the Trigger Platform 1012 sends the request to the MAR (messaging applications router) 1018. Then at 1016, the MAR 1018 sends the request to the server platform (e.g., QuickReach Platform) 1022. At 1020, the server platform 1022 connects to the CAM (customer account manager) interface 1024 to perform the requested service and retrieve information. The CAM interface 1024 communicates with the billing systems (e.g., CARE 1026 and Telegence 1028) to retrieve data and utilizes any unbilled air 1030 from the subscriber account to process and perform the Service Request.

At 1032, the server platform 1022 forwards the requested data/service in SMS messages to the SMSC 1034. And at 1036, the SMSC 1034 sends the requested data via SMS message to the mobile handset 1002.

Figure 11:
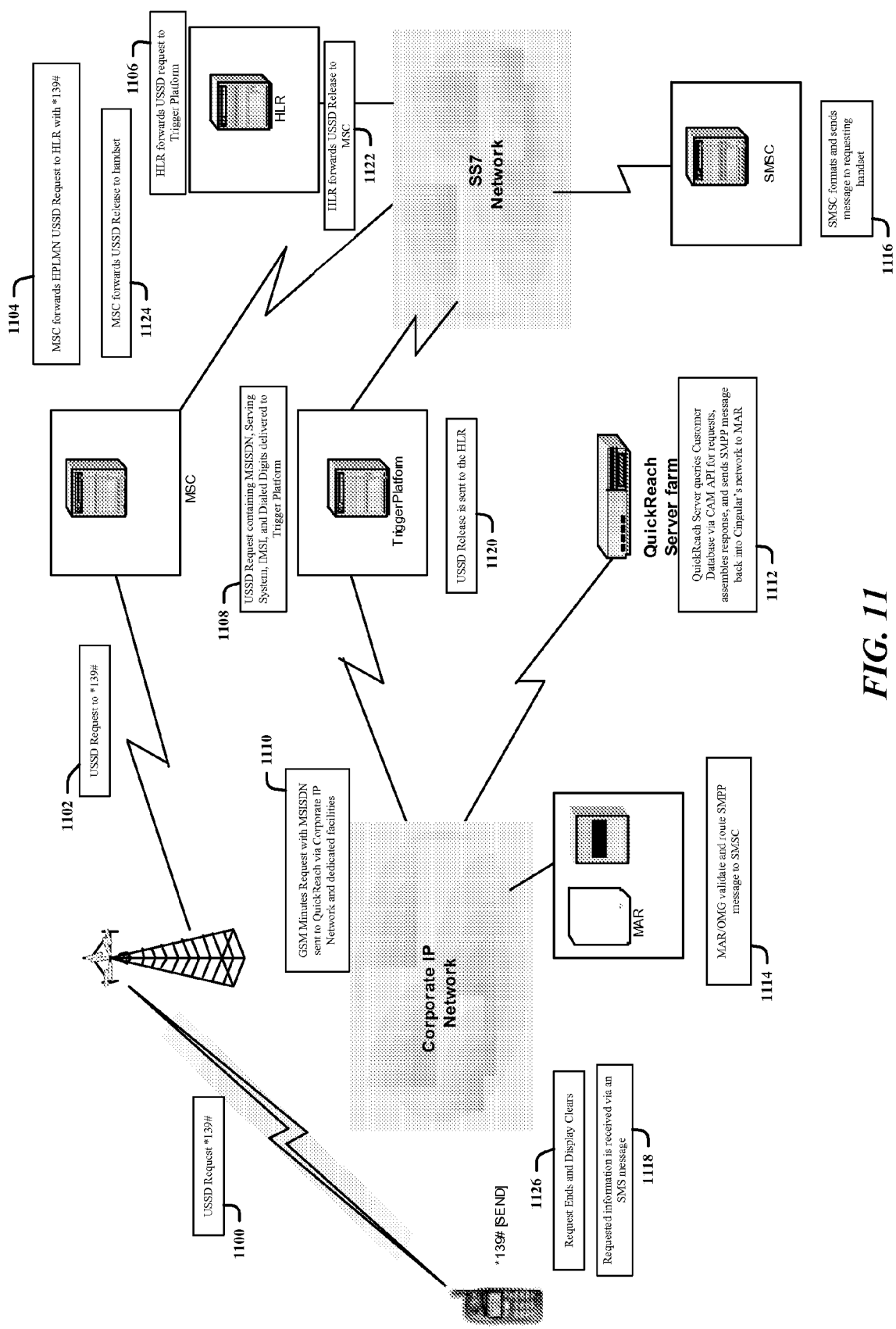
FIG. 11 illustrates a GSM trigger system diagram in accordance with the invention.

FIG. 11 illustrates a GSM trigger system diagram in accordance with the invention. At 1100, a subscriber utilizes a mobile handset to initiate a USSD (unstructured supplementary service data) Call Request signal using a character set (e.g., *139#), and then presses a SEND command. At 1102, the base station receives the USSD Call Request signal and forwards it to the MSC (mobile switching center). At 1104, the MSC forwards the HPLMN USSD Request to an HLR (Home Location Register). At 1106, the HLR then forwards the USSD Request to a Trigger Platform. At 1108, the USSD Request containing the MSISDN, Serving System, IMSI and Dialed Digits is delivered to the Trigger Platform.

At 1110, a GSM Minutes Request with MSISDN is sent to the server farm (e.g., QuickReach Server farm) via the Corporate IP Network and dedicated facilities. At 1112, the QuickReach Server queries the Customer Database via a CAM API (customer account manager application protocol interface) for requests, assembles the response, and sends the SMPP message back into the telecommunication carrier's network to a MAR (messaging applications router). At 1114, the MAR/OMG validates and routes the SMPP message to the SMSC (short messaging service center). At 1116, the SMSC formats and sends the message to the requesting mobile handset. At 1118, the requested information is received via an SMS message from the SMSC. At 1120, a USSD Release is sent to the HLR. At 1122, the HLR forwards the USSD Release to the MSC. At 1124, the MSC forwards the USSD Release to the mobile handset. And at 1126, the Request ends and the display clears.

| GSM Network Requirements | |
|---|---|
| BRID | Requirements |
| BR-300 | For GSM implementations, translations work in the HLRs for the USSD short codes so the HLRs know to forward these requests to the Services Trigger platform. |

Figure 12:
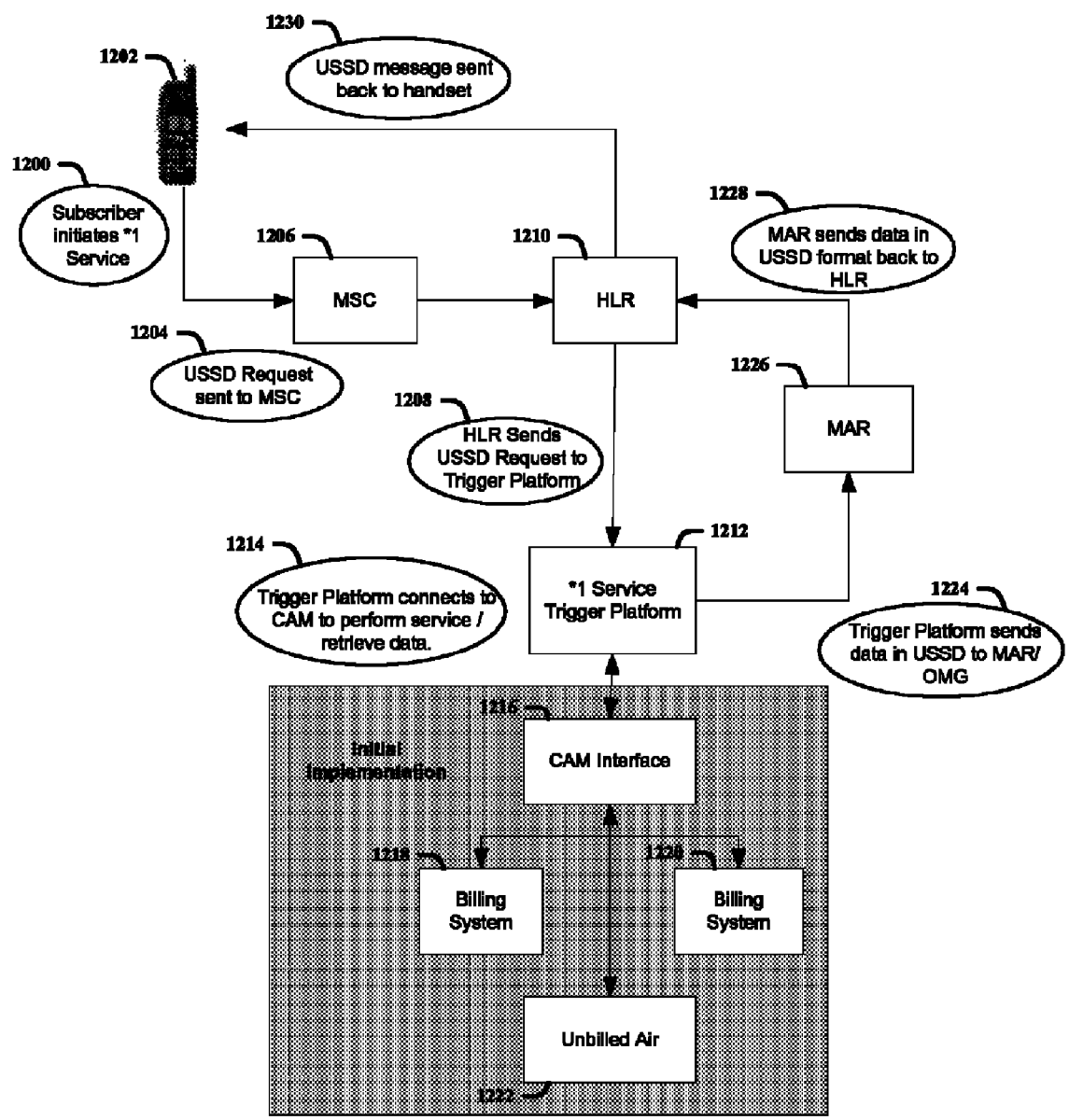
FIG. 12 illustrates an exemplary GSM services network in accordance with the invention.

FIG. 12 illustrates an exemplary GSM services network in accordance with the invention. GSM "Unstructured Supplementary Service Data" (USSD) supports simple dialed string triggers. USSD is standard GSM messaging deployed and used worldwide. GSM forwards USSD dialed string triggers to the HLR for processing or forwarding to a USSD Gateway. USSD Servers attached to the Gateway can process the trigger to IT systems and provide responses to the handset via USSD (or no response at all). GSM USSD can be used for providing the "trigger" and SMS can be used for the response. GSM USSD will work while roaming outside the carrier network.

USSD triggers should follow GSM standards. SMS delivery provides a universal customer experience. SMS delivery and High-Speed SMSC or some other similar platform can deliver the message in near real time. An application interface (e.g., CAM) allows machine-to-machine queries to all subscriber account information. The CAM interface can be used to query requested data.

Specifically, at 1200 a subscriber initiates a Service Request signal using a character set (e.g., *1), and then presses a SEND command on the mobile handset 1202. At 1204, the *1 (dialed digits) is then processed as an USSD Request and sent to the MSC 1206. At 1208, the USSD Request is sent to the Trigger Platform 1212 via the HLR 1210. Then at 1214, the Trigger Platform 1212 connects to the CAM (customer account manager) interface 1216 to perform the requested service and retrieve data. The CAM interface 1216 communicates with the billing systems (e.g., CARE 1218 and Telegence 1220) to retrieve data and utilizes any unbilled air 1222 from the subscriber account to process and perform the Service Request. At 1224, the Trigger Platform sends the data in USSD format to a MAR/OMG (messaging applications router/open messaging gateway). At 1228, the MAR 1226 then sends the data in USSD format back to the HLR 1210. And at 1230, the HLR 1210 sends the USSD message back to the mobile handset 1202.

Figure 13:
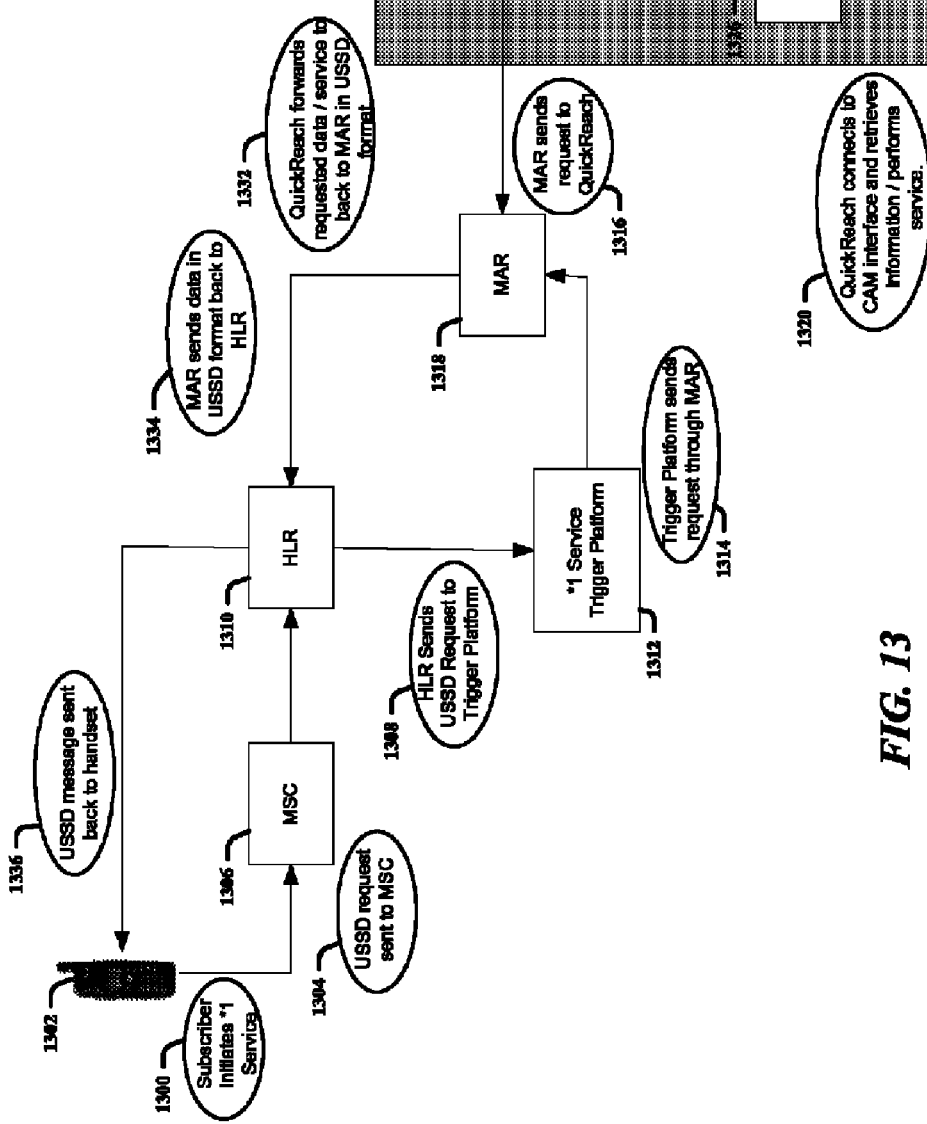
FIG. 13 illustrates an alternative GSM services network in accordance with the invention.

FIG. 13 illustrates an alternative GSM services network in accordance with the invention. At 1300, a subscriber initiates a Service Request signal using a character set (e.g., *1), and then presses a SEND command on the mobile handset 1302. At 1304, the *1 (dialed digits) is then processed as an USSD Request and sent to the MSC 1306. At 1308, the USSD Request is sent to the Trigger Platform 1312 via the HLR 1310. At 1314, the Trigger Platform 1312 sends the request to the MAR (messaging applications router) 1318. Then at 1316, the MAR 1318 sends the request to the server platform (e.g., QuickReach Platform) 1322. At 1320, the server platform 1322 connects to the CAM (customer account manager) interface 1324 to perform the requested service and retrieve information. The CAM interface 1324 communicates with the billing systems (e.g., CARE 1326 and Telegence 1328) to retrieve data and utilizes any unbilled air 1330 from the subscriber account to process and perform the Service Request. At 1332, the server platform 1322 forwards the requested data/service in USSD format back to the MAR 1318. At 1334, the MAR 1318 then sends the data in USSD format back to the HLR 1310. And at 1336, the HLR 1310 sends the USSD message back to the mobile handset 1302.

Figure 14:
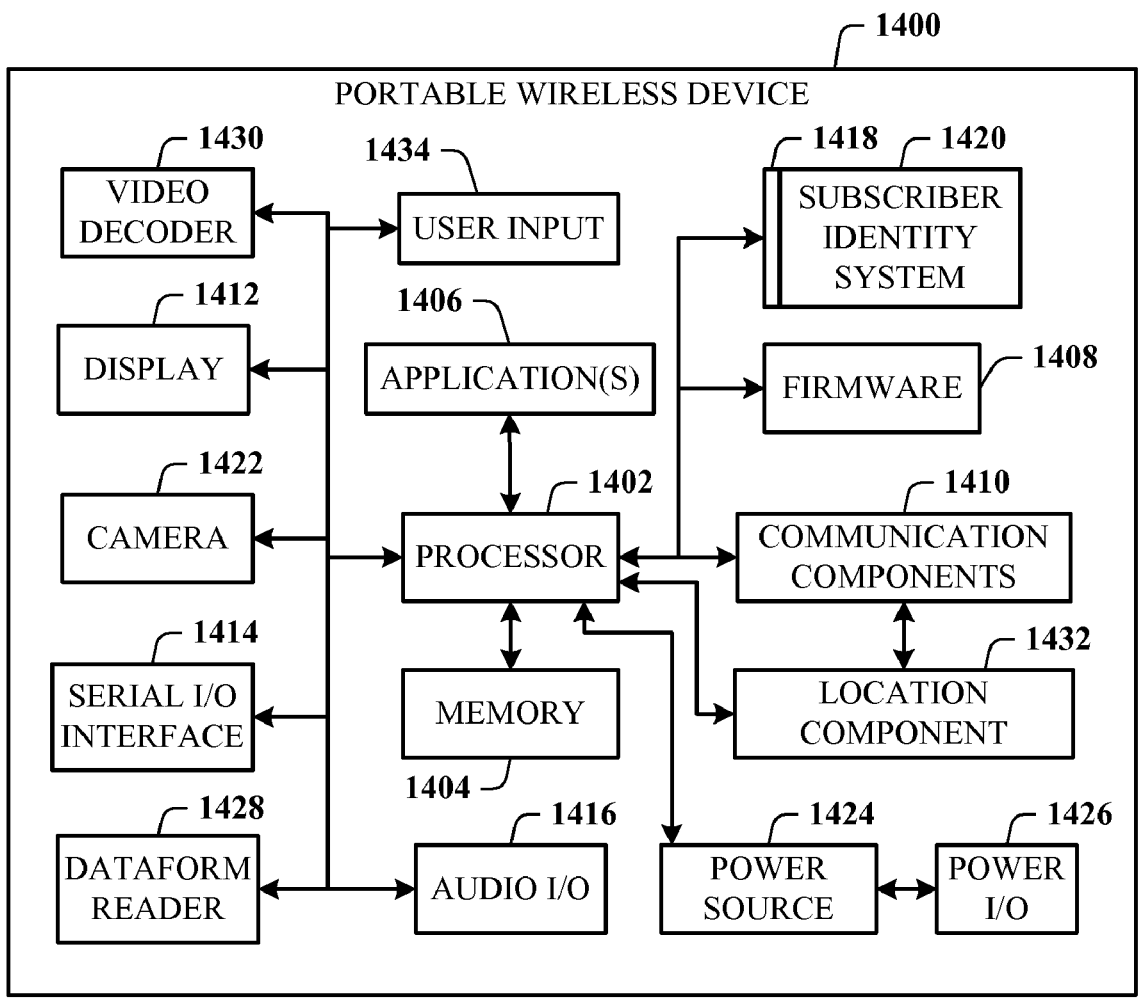
FIG. 14 illustrates a block diagram of the portable wireless device operable to perform payment access and processing via the architecture of the subject invention.

Referring now to FIG. 14, there is illustrated a block diagram of the portable wireless device (PWD) 1400 (e.g., a mobile terminal) operable to perform payment access and processing via the architecture of the subject invention. The PWD 1400 includes a processor 1402 for controlling and processing all onboard operations and functions. A memory 1404 interfaces to the processor 1402 for storage of data and one or more applications 1406 (e.g., a video player software, user feedback component software, etc.). Other applications can include voice recognition of predetermined voice commands that facilitate initiation of the user feedback signal. The applications 1406 can be stored in the memory 1404 and/or in a firmware 1408, and executed by the processor 1402 from either or both the memory 1404 or/and the firmware 1408. Here, the application(s) 1406 can include SSA and SAP architecture. Additionally, applications can be provided that facilitate SMS and/or MMS (Multimedia Messaging Service) capabilities of the device 1400. The firmware 1408 also stores startup code for execution in initializing the PWD 1400. A communications component 1410 interfaces to the processor 1402 to facilitate wired/wireless communication with external systems, (e.g., cellular networks (2G, 2.5G, 3G and 4G), VoIP networks, etc.) The communications component 1410 includes capabilities such that concurrent sessions and contexts for QoS requirements can be realized. The PWD 1400 includes devices such as a cellular telephone, a PDA with mobile communications capabilities, and messaging-centric devices.

The PWD 1400 includes a display 1412 for displaying text, images, video, telephony functions (e.g., a Caller ID function), setup functions, and for user input. The display 1412 can also accommodate the presentation of multimedia content. A serial I/O interface 1414 is provided in communication with the processor 1402 to facilitate serial communication (e.g., USB, and/or IEEE 1394) via a hardwire connection, and other serial input devices (e.g., a keyboard, keypad, and mouse). This supports updating and troubleshooting the PWD 1400, for example. Audio capabilities are provided with an audio I/O component 1416, which can include a speaker for the output of audio signals related to, for example, indication that the user pressed the proper key or key combination to initiate the user feedback signal. The audio I/O component 1416 also facilitates the input of audio signals via a microphone to record data and/or telephony voice data, and for inputting voice signals for telephone conversations.

The PWD 1400 includes a slot interface 1418 for accommodating a SIC (Subscriber Identity Component) in the form factor of a Subscriber Identity Module (SIM) card 1420, and interfacing the SIM card 1420 with the processor 1402. However, it is to be appreciated that the SIM card 1420 can be manufactured into the PWD 1400, and updated by downloading data and software thereinto.

The PWD 1400 can process IP data traffic via the communication component 1410 to accommodate IP traffic from an IP network such as, for example, the Internet, a corporate intranet, a home network, a person area network, etc., via an ISP or cable provider. Thus, VoIP traffic can be utilized by the PWD 1400, and IP-based multimedia content can be received in either an encoded or a decoded format.

A video processing component 1422 (e.g., a camera) can be provided for decoding encoded multimedia content. The PWD 1400 also includes a power source 1424 in the form of batteries and/or an AC power subsystem, which power source 1424 interfaces to an external power system or charging equipment (not shown) via a power I/O component 1426.

The PWD 1400 can also include a dataform reader 1428 suitably designed to read many types of dataforms. For example, the reader 1428 can scan product bar codes of two and three dimensions, and other types of indicia.

The PWD 1400 can also include a video decoder component 1430 for processing video content received and transmitted. A location tracking component 1432 facilitates geographically locating the PWD 1400 (e.g., GPS-Global Positioning System). As described hereinabove, this can occur when the user initiates the feedback signal automatically or manually.

A user input component 1434 facilitates the user initiating the quality feedback signal. The input component can include such conventional input device technologies such as a keypad, keyboard, mouse, stylus pen, and touch screen, for example.

Figure 15:
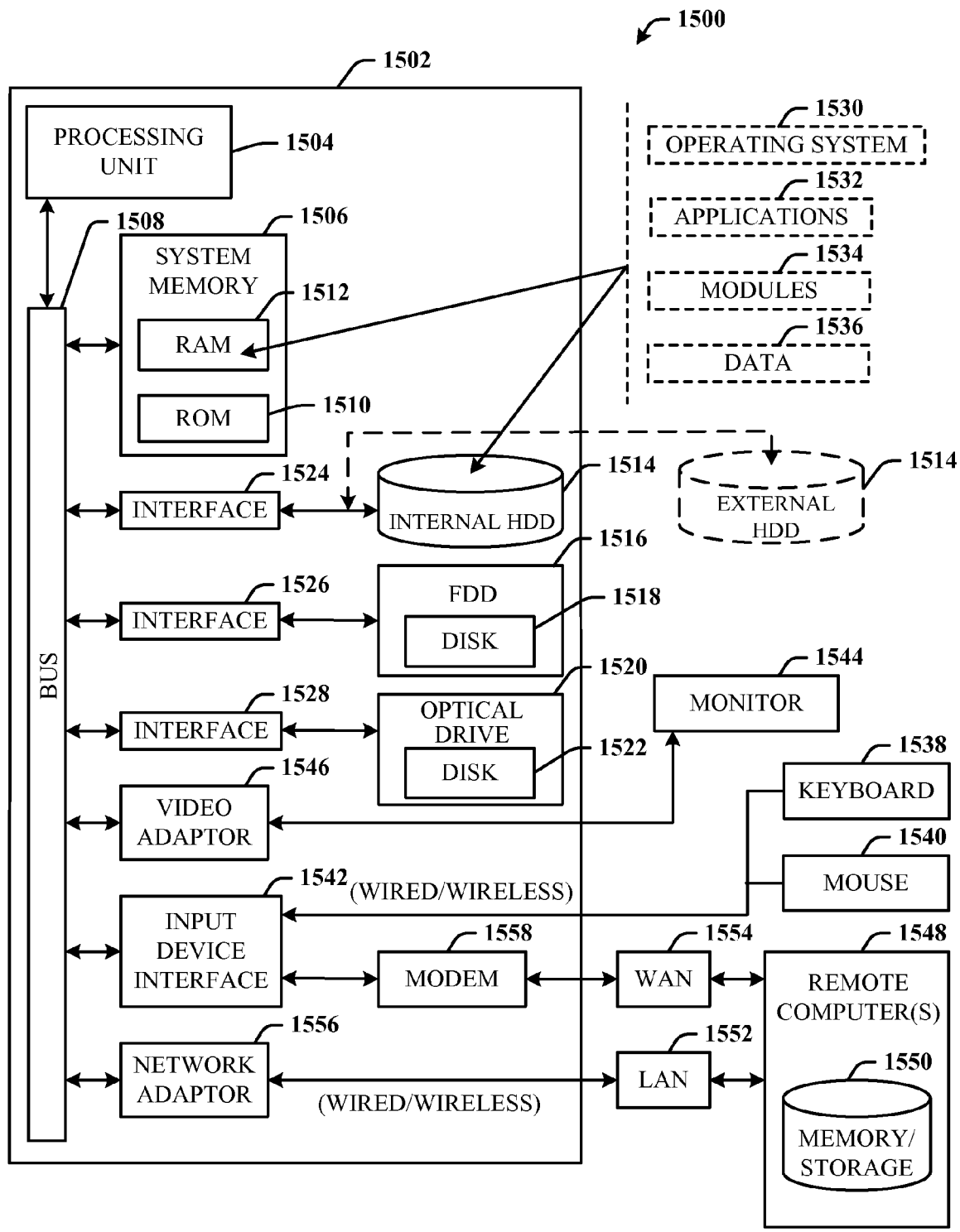
FIG. 15 illustrates a block diagram of a computer operable to execute the disclosed architecture.

Referring now to FIG. 15, there is illustrated a block diagram of a computer operable to execute the disclosed architecture. In order to provide additional context for various aspects of the subject invention, FIG. 15 and the following discussion are intended to provide a brief, general description of a suitable computing environment 1500 in which the various aspects of the invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both, volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 15, the exemplary environment 1500 for implementing various aspects of the invention includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures may also be employed as the processing unit 1504.

The system bus 1508 can be any of several types of bus structure that may further interconnect to a memory bus (with or without a memory controller), a peripheral bus, and a local bus using any of a variety of commercially available bus architectures. The system memory 1506 includes read-only memory (ROM) 1510 and random access memory (RAM) 1512. A basic input/output system (BIOS) is stored in a non-volatile memory 1510 such as ROM, EPROM, EEPROM, which BIOS contains the basic routines that help to transfer information between elements within the computer 1502, such as during start-up. The RAM 1512 can also include a high-speed RAM such as static RAM for caching data.

The computer 1502 further includes an internal hard disk drive (HDD) 1514 (e.g., EIDE, SATA), which internal hard disk drive 1514 may also be configured for external use in a suitable chassis (not shown), a magnetic floppy disk drive (FDD) 1516, (e.g., to read from or write to a removable diskette 1518) and an optical disk drive 1520, (e.g., reading a CD-ROM disk 1522 or, to read from or write to other high capacity optical media such as the DVD). The hard disk drive 1514, magnetic disk drive 1516 and optical disk drive 1520 can be connected to the system bus 1508 by a hard disk drive interface 1524, a magnetic disk drive interface 1526 and an optical drive interface 1528, respectively. The interface 1524 for external drive implementations includes at least one or both of Universal Serial Bus (USB) and IEEE 1394 interface technologies. Other external drive connection technologies are within contemplation of the subject invention.

The drives and their associated computer-readable media provide nonvolatile storage of data, data structures, computer-executable instructions, and so forth. For the computer 1502, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. It is appreciated that the invention can be implemented with various commercially available operating systems or combinations of operating systems.

A user can enter commands and information into the computer 1502 through one or more wired/wireless input devices, (e.g., a keyboard 1538 and a pointing device, such as a mouse 1540). Other input devices (not shown) may include a microphone, an IR remote control, a joystick, a game pad, a stylus pen, touch screen, or the like. These and other input devices are often connected to the processing unit 1504 through an input device interface 1542 that is coupled to the system bus 1508, but can be connected by other interfaces, such as a parallel port, an IEEE 1394 serial port, a game port, a USB port, an IR interface, etc.

A monitor 1544 or other type of display device is also connected to the system bus 1508 via an interface, such as a video adapter 1546. In addition to the monitor 1544, a computer typically includes other peripheral output devices (not shown), such as speakers, printers, etc.

The computer 1502 may operate in a networked environment using logical connections via wired and/or wireless communications to one or more remote computers, such as a remote computer(s) 1548. The remote computer(s) 1548 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1550 is illustrated. The logical connections depicted include wired/wireless connectivity to a local area network (LAN) 1552 and/or larger networks, (e.g., a wide area network (WAN) 1554).

Such LAN and WAN networking environments are commonplace in offices and companies, and facilitate enterprise-wide computer networks, such as intranets, all of which may connect to a global communications network, (e.g., the Internet).

When used in a LAN networking environment, the computer 1502 is connected to the local network 1552 through a wired and/or wireless communication network interface or adapter 1556. The adaptor 1556 may facilitate wired or wireless communication to the LAN 1552, which may also include a wireless access point disposed thereon for communicating with the wireless adaptor 1556.

When used in a WAN networking environment, the computer 1502 can include a modem 1558, or is connected to a communications server on the WAN 1554, or has other means for establishing communications over the WAN 1554, such as by way of the Internet. The modem 1558, which can be internal or external and a wired or wireless device, is connected to the system bus 1508 via the serial port interface 1542. In a networked environment, program modules depicted relative to the computer 1502, or portions thereof, can be stored in the remote memory/storage device 1550. It will be appreciated that the network connections shown are exemplary and other means of establishing a communications link between the computers can be used.

The computer 1502 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, (e.g., computers), to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 16:
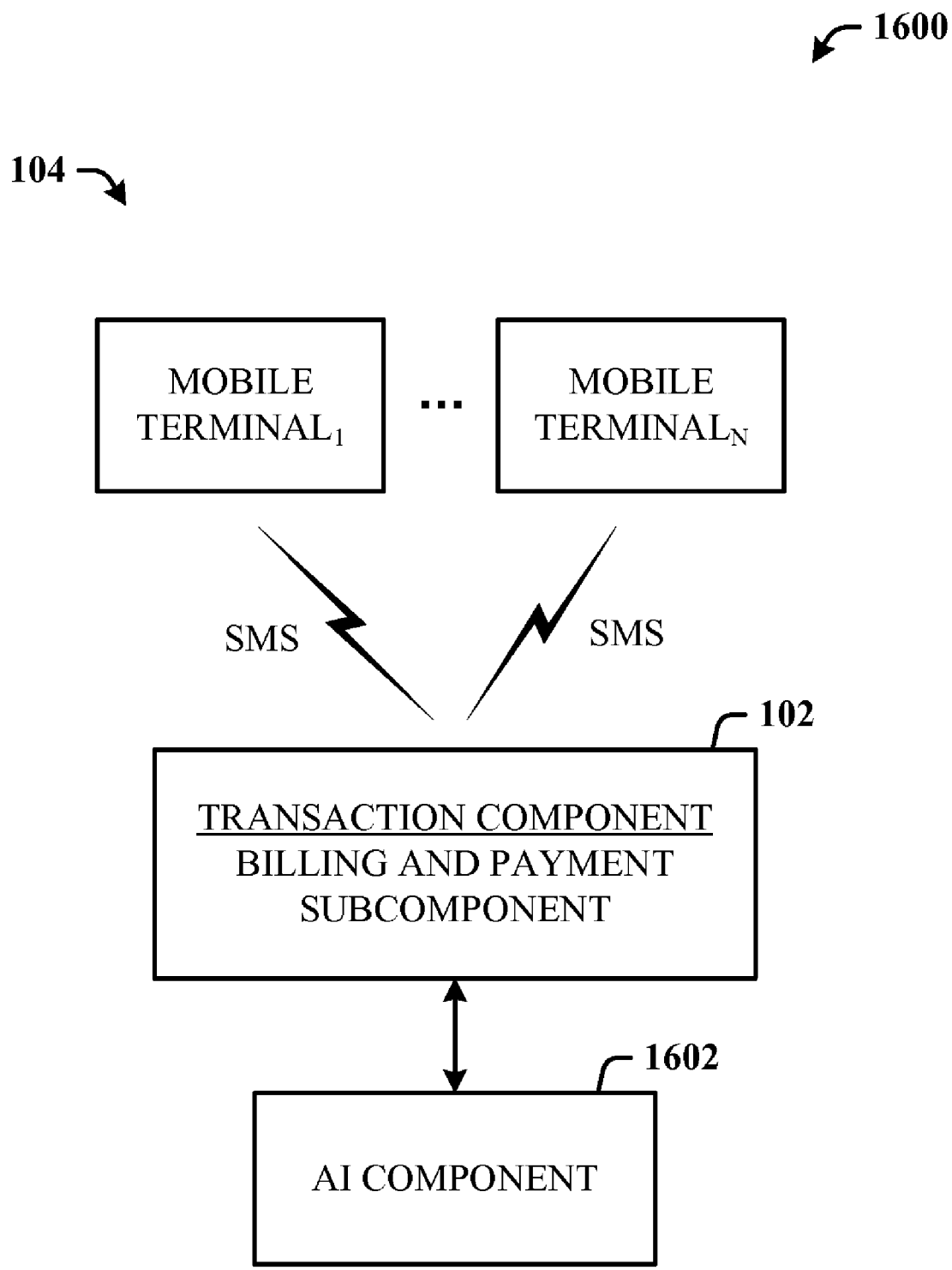
FIG. 16 illustrates a system that employs an artificial intelligence which facilitates automating one or more features in accordance with the subject invention.

FIG. 16 illustrates a system 1600 that employs an artificial intelligence (AI) component 1602 which facilitates automating one or more features in accordance with the subject invention. The subject invention (e.g., in connection with selection) can employ various AI-based schemes for carrying out various aspects thereof. For example, a process for determining when to employ the LPM can be facilitated via an automatic classifier system and process.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be employed to automatically learn and perform a number of functions, including but not limited to determining according to a predetermined criteria what data the subscriber will likely want to see based on past system interaction. For example, if the user routinely, yet not though subscription or according to a user profile, accesses the account information at a certain time and not according to the default settings, the AI component 1602 can learn this and automatically alter the selections and/or data to be presented to the subscriber. Such a feature can be an opt-in feature provided by the carrier. This is particularly useful where the user oftentimes is known to access the system. Thus, by automating the access, the burden on the system and the subscriber is further reduced by presenting the most likely data that the user wants to see without presenting information that is typically not deemed important to the user.

Figure 17:
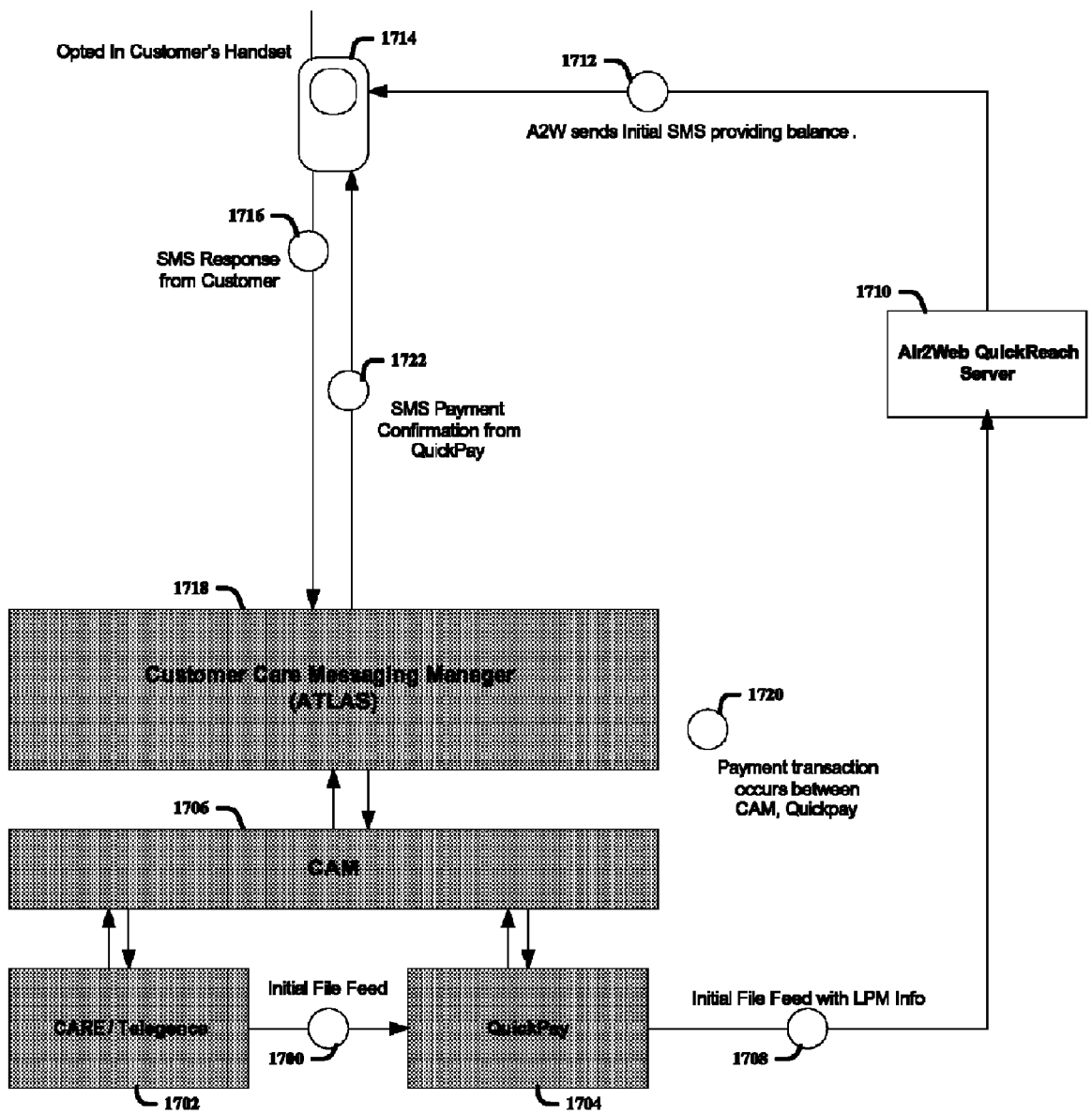
FIG. 17 illustrates a flow diagram of messaging for a credit card payment method in accordance with the invention.

FIG. 17 illustrates a flow diagram of messaging for a credit card payment method in accordance with the invention. The telecommunication carrier utilizes a CAM (customer account manager) 1706 to compile a listing of subscribers from various billing systems (e.g., CARE and Telegence) 1702 whose bills are available for payment (a Bill-Ready Subscribers list). At 1700, an initial file feed occurs, wherein the bill-ready files are sent to a payment engine (e.g., QuickPay) 1704. At 1708, the payment engine appends last payment method (LPM) data to the bill-ready notification files and sends them to the messaging service (e.g., Air2Web) 1710. At 1712, the messaging service 1710 then sends the bill-ready notification files containing account balance information to the subscriber's mobile handset 1714 via SMS messages.

Then at 1716, the subscriber executes payment of the bill-ready notification file via an SMS Response to the Customer Care Messaging Manager (e.g., ATLAS) 1718. Specifically, the SMS Response affirms payment of the account balance via the credit card listed on file for the subscriber. The SMS Response is then forwarded to the CAM 1706. And at 1720, a payment transaction occurs between the CAM 1706 and the payment engine 1704. The transaction is processed and at 1722 the Messaging Manager 1718 sends an SMS payment confirmation message from the payment engine 1704 to the subscriber's mobile handset 1714.

Figure 18:
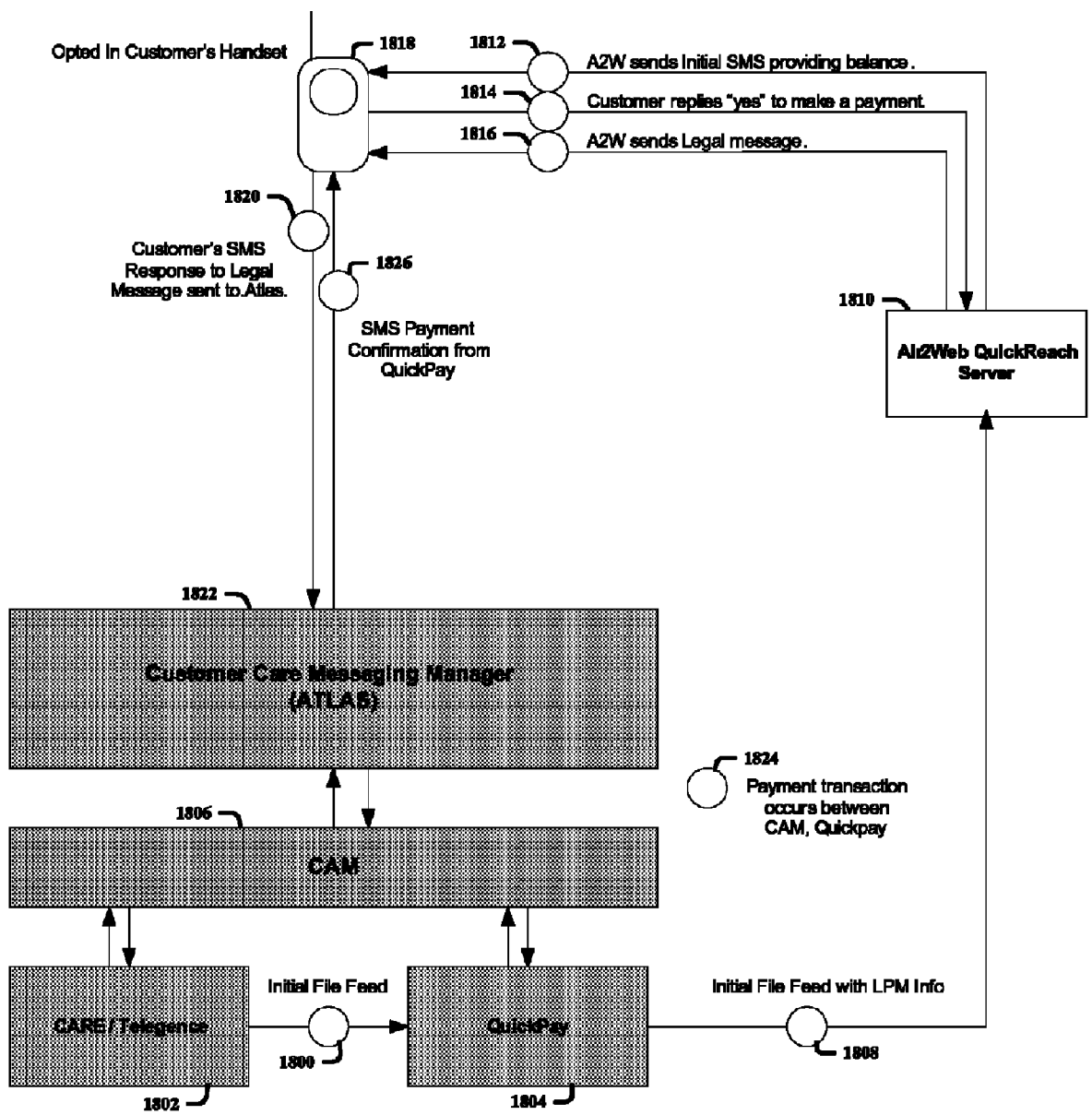
FIG. 18 illustrates a flow diagram of messaging for a bank draft payment method in accordance with the invention.

FIG. 18 illustrates a flow diagram of messaging for a bank draft payment method in accordance with the invention. The telecommunication carrier utilizes a CAM (customer account manager) 1806 to compile a listing of subscribers from various billing systems (e.g., CARE and Telegence) 1802 whose bills are available for payment (a Bill-Ready Subscribers list). At 1800, an initial file feed occurs, wherein the bill-ready files are sent to a payment engine (e.g., QuickPay) 1804. At 1808, the payment engine appends last payment method (LPM) data to the bill-ready notification files and sends them to the messaging service (e.g., Air2Web) 1810. At 1812, the messaging service 1810 then sends the initial bill-ready notification files containing account balance information to the subscriber's mobile handset 1818 via SMS messages.

Specifically, the SMS message contains the specific amount due and asks if the subscriber would like to execute payment via the bank account listed on file. At 1814, the subscriber responds in the affirmative to make the payment. At 1816, the affirmative response triggers the messaging service 1810 to send a Legal message to the subscriber. Specifically, the Legal message states "By replying to this message, I authorize my bank to deduct from my bank account this one-time payment of my telecommunications carrier bill." Then, the subscriber executes payment of the bill-ready notification file via an SMS Response to the Legal message affirming payment of the account balance via the bank account listed on file for the subscriber. At 1820, the subscriber's SMS Response to the Legal message is sent to the Customer Care Messaging Manager (e.g., ATLAS) 1822. The SMS Response is then forwarded to the CAM 1806. And at 1824, a payment transaction occurs between the CAM 1806 and the payment engine 1804. The transaction is processed and at 1826 the Messaging Manager 1822 sends an SMS payment confirmation message from the payment engine 1804 to the subscriber's mobile handset 1818.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates billing and payment of postpaid mobile services, comprising:
   a mobile terminal that processes a short message service (SMS) message; and
   a transaction component that facilitates communication of an account notification message to the mobile terminal via the SMS message, whereupon wherein, in response to receipt of the account notification message, a menu is presented via which a selection from the menu facilitates payment of a mobile services bill; and
   an artificial intelligence component that employs at least one of a probabilistic or statistical-based analysis to prognose or infer an action to be performed.

2. The system of claim 1, wherein the SMS message further comprises a method of payment.

3. The system of claim 1, wherein the account notification message is communicated before the payment is due.

4. The system of claim 1, wherein the account notification message includes payment data and payment of the bill is initiated via the transaction component.

5. The system of claim 1, wherein the account notification message includes at least one of current balance data, last payment method, or personal financial account data.

6. The system of claim 1, wherein receipt of the account notification message is selectable.

7. The system of claim 1, wherein the SMS message facilitates presentation of the menu via which an interactive voice response (IVR) system is accessed.

8. The system of claim 1, wherein the SMS message facilitates presentation of the menu via which remaining call time balance data on an account is accessed.

9. A method of facilitating billing and payment of postpaid mobile services, comprising computer-executable acts of:
   at least one of probabilistically or statistically analyzing including prognosing or inferring an action to be performed associated with mobile services of a user account;
   generating an SMS message associated with the mobile services of the user account;
   communicating an account notification message over a cellular network to a mobile terminal via the SMS message;
   processing the account notification message at the mobile terminal for payment data, including at least personal financial account data associated with the user account;
   displaying a menu that corresponds to the payment data specific to information representing a user; and
   initiating payment of the mobile services via the mobile terminal.

10. The method of claim 9, wherein the payment data further includes data related to at least one of total current balance, current past due balance, or last payment method.

11. The method of claim 9, wherein the act of initiating includes payment of one of total current account balance or current past due account balance.

12. The method of claim 9, further comprising receiving a confirmation message that the payment has been received.

13. The method of claim 9, wherein the communicating is performed before a payment is due.

14. The method of claim 9, further comprising appending last payment method data to the notification message prior to the communicating.

15. The method of claim 9, further comprising receiving the account notification message, wherein the receiving is selectable by user input.

16. The method of claim 9, wherein the displaying allows access to remaining call time balance data on the user account.

17. A system that facilitates billing and payment of postpaid mobile services, comprising:
   means for employing a probabilistic and/or statistical-based analysis to prognose or infer an action to be automatically performed regarding payment of mobile services;
   means for processing an SMS message to a mobile terminal associated with a user account that has been subscribed to the system;
   means for communicating an account notification message to the mobile terminal via the SMS message;
   means for receiving the account notification message; and
   means for displaying a menu corresponding to the account notification message, wherein the account notification message includes at least one of current account balance data, last payment method, or personal financial account data of associated with the user account.

18. The system of claim 17, further comprising means for initiating payment, wherein the menu includes a selection to facilitate payment of the mobile services bill associated with the user account.

* * * * *